US008451957B2

(12) United States Patent
Zhengang et al.

(10) Patent No.: US 8,451,957 B2
(45) Date of Patent: May 28, 2013

(54) SYSTEM AND METHOD FOR TIME SYNCHRONIZATION OF OFDM-BASED COMMUNICATIONS

(75) Inventors: Pan Zhengang, Hong Kong (CN); Tao Li, Hong Kong (CN); Yiqing Zhou, Hong Kong (CN); Man Wai Kwan, Hong Kong (CN)

(73) Assignee: Hong Kong Applied Science and Technology Research Institute Co., Ltd., Hong Kong (CN)

( * ) Notice: Subject to any disclaimer, the term of this patent is extended or adjusted under 35 U.S.C. 154(b) by 1066 days.

(21) Appl. No.: 12/421,536

(22) Filed: Apr. 9, 2009

(65) Prior Publication Data

US 2010/0260294 A1    Oct. 14, 2010

(51) Int. Cl.
*H04L 27/06* (2006.01)
(52) U.S. Cl.
USPC ......................................................... 375/343
(58) Field of Classification Search
USPC .......... 375/142, 143, 150, 152, 343; 704/216, 704/218, 237, 263; 708/5, 422, 813; 342/108, 342/145, 189, 378
See application file for complete search history.

(56) References Cited

U.S. PATENT DOCUMENTS

| | | | |
|---|---|---|---|
| 7,180,963 B2 * | 2/2007 | Wang et al. .................... | 375/324 |
| 2004/0156308 A1 | 8/2004 | Ha et al. | |
| 2004/0161022 A1 * | 8/2004 | Glazko et al. ................ | 375/152 |
| 2007/0268974 A1 | 11/2007 | Chun et al. | |
| 2008/0267304 A1 * | 10/2008 | Chong et al. .................. | 375/260 |
| 2009/0103667 A1 * | 4/2009 | Du et al. ........................ | 375/343 |
| 2010/0061478 A1 * | 3/2010 | Liu et al. ....................... | 375/267 |

FOREIGN PATENT DOCUMENTS

CN    101056296 A    10/2007

OTHER PUBLICATIONS

Van De Beek, Jan-Jaap, Sandell, Magnus, Borjesson, Per Ola, "ML Estimation of Time and Frequency Offset in OFDM Systems," IEEE Transactions on Signal Processing, vol. 45, No. 7, pp. 1800-1805, Jul. 1997.
Williams, C., Beach, M.A., McLaughlin, S., "Robust OFDM Timing Synchronisation," 4 pgs., 0-7803-9392-9/06 (c) 2006 IEEE.
Schmidl, T.M., Cox, D.C., "Robust Frequency and Timing Synchronization for OFDM," IEEE Transactions on Communications, vol. 45, No. 12, Dec. 1997, pp. 1613-1621.
Landstrom, D., Wilson, S.K., Van De Beek, J.J., Odling, P., Borjesson, P.O., "Symbol Time Offset Estimation in Coherent OFDM Systems," 0-7803-5284-X/99 © 1999 IEEE; pp. 500-505.
Minn, H, Bhargava, V.K., Letaief, K.B.; "A Robust Timing and Frequency Synchronization for OFDM Systems," IEEE Transactions on Wireless Communications, vol. 2, No. 4, Jul. 2003; pp. 822-839.

(Continued)

*Primary Examiner* — Khanh C Tran
(74) *Attorney, Agent, or Firm* — Fulbright & Jaworski L.L.P.

(57) ABSTRACT

Systems and methods for time synchronization of orthogonal frequency-division multiplexing (OFDM)-based communications are disclosed. A cyclic prefix (CP) correlation-based timing synchronization method is disclosed for early path (e.g. first-received path) detection for OFDM-based communication. Systems and methods are disclosed for performing double peak value detection in an OFDM-based system for reliably detecting an early (e.g., first-received) path in a received OFDM symbol for use in timing synchronization. In the double peak value detection method, a first peak value detection is performed to detect the path with the largest power, and a second peak value detection is then performed to detect a desired early (e.g., first-received) path. A compensation linear curve is used to facilitate the second peak value detection.

23 Claims, 13 Drawing Sheets

OTHER PUBLICATIONS

Hsieh, M., Wei, C.; "A Low Complexity Frame Synchronization and Frequency Offset Compensation Scheme for OFDM Systems over Fading Channels," IEEE Transactions on Vehicular Technology, vol. 48, No. 5, Sep. 1999; pp. 1595-1609.

Yang, B., Letaief, K. B., Cheng, R. S., Cao, Z., "Timing Recovery for OFDM Transmission," IEEE Journal on Selected Areas in Communications, vol. 18, No. 11, Nov. 2000, pp. 2278-2291.

Takahashi, K. Saba, T., "A Novel Symbol Synchronization Algorithm With Reduced influence of ISI for OFDM Systems," 0-7803-7206-9/01 © 2001 IEEE; pp. 524-528.

Liu, P., Li, B.B., Lu, Z., Gong, F., "A Novel Symbol Synchronization Scheme for OFDM," 0-7803-9015-6/05 © 2005 IEEE, pp. 247-251.

Lee, D. Cheun, K., "Coarse Symbol Synchronization Algorithms for OFDM Systems in Multipath Channels," IEEE Communications Letters, vol. 6., No. 10, Oct. 2002; pp. 446-448.

Palin, A., Pikkarainen, J., Rinne, J., "Improved Symbol Synchronization Method in OFDM System in Channels With Large Delay Spreads," in Proceedings of the 1st International Symposium on Communication Systems and Digital Signal Processing (CSDSP '98), Sheffield, UK, Apr. 1998, pp. 309-312.

Huang, Y. Sheu, C., Huang, C., "Joint Synchronization in Eureka 147 DAB System Based on Abrupt Phase Change Detection," IEEE Journal on Selected Areas in Communications, vol. 17, No. 10, Oct. 1999; pp. 1770-1780.

Palin, A., Rinne, J., "Enhanced Symbol Synchronization Method for OFDM System in SFN Channels," 0-7803-4984-9/98 © 1998 IEEE, pp. 2788-2793.

Son, S., Kim, J., "A Robust Coarse Symbol Timing Synchronization for OFDM Systems in Multi-Path Fading Channel," in Proceedings of the IEEE International Syposium on Consumer Electronics 2008 (ISCE 2008), pp. 1-3, Vilamoura, Apr. 2008 (ISBN: 978-1-4244-2422-1).

Williams, C., McLaughlin, S. Beach, M., "Robust OFDM Timing Synchronisation in Multipath Channels," EURASIP Journal on Wireless Communication and Networking, vol. 2008, Article ID 675048, 12 pages, 2008.

* cited by examiner

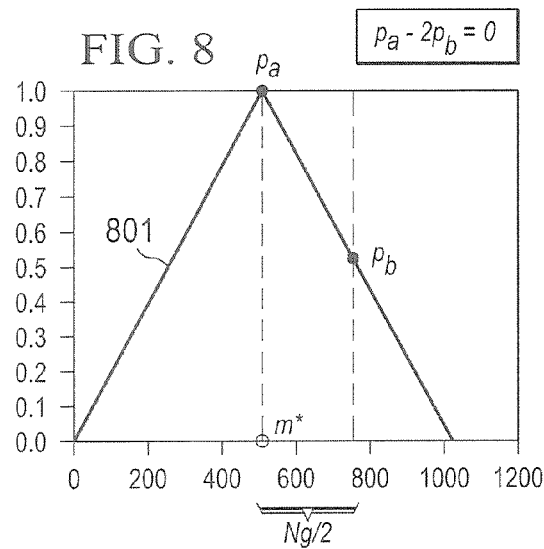
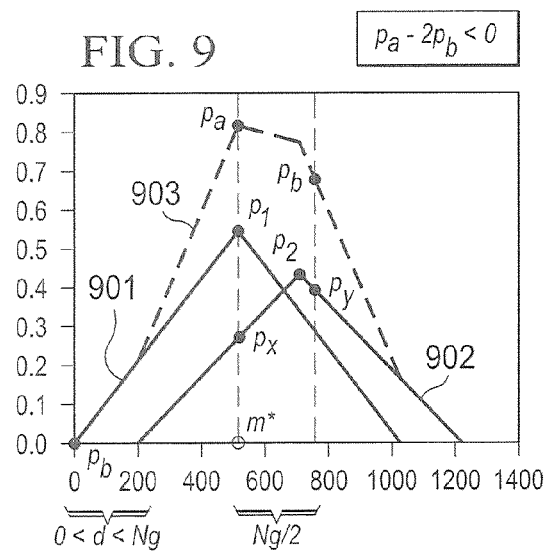
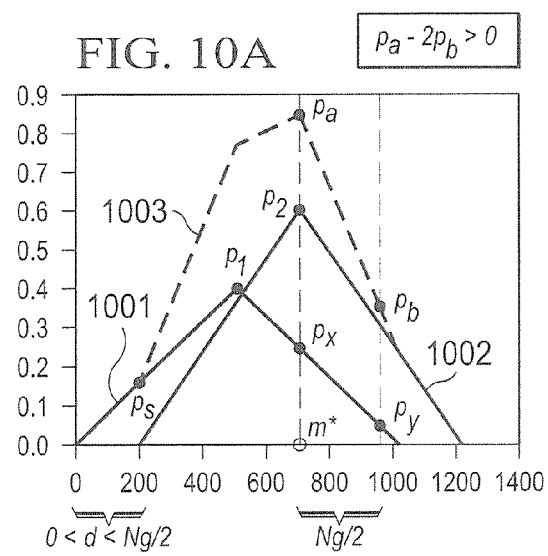
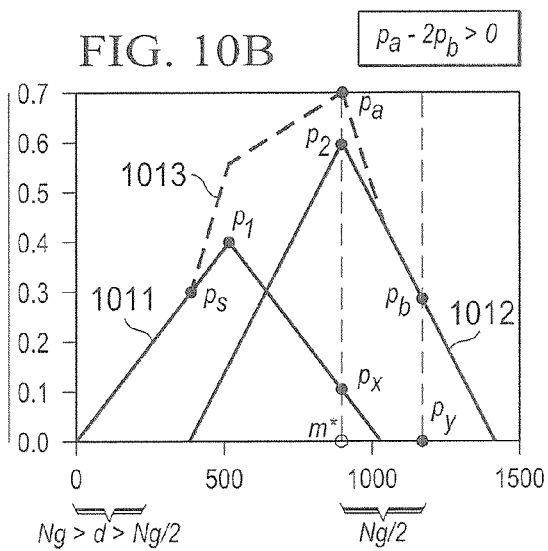

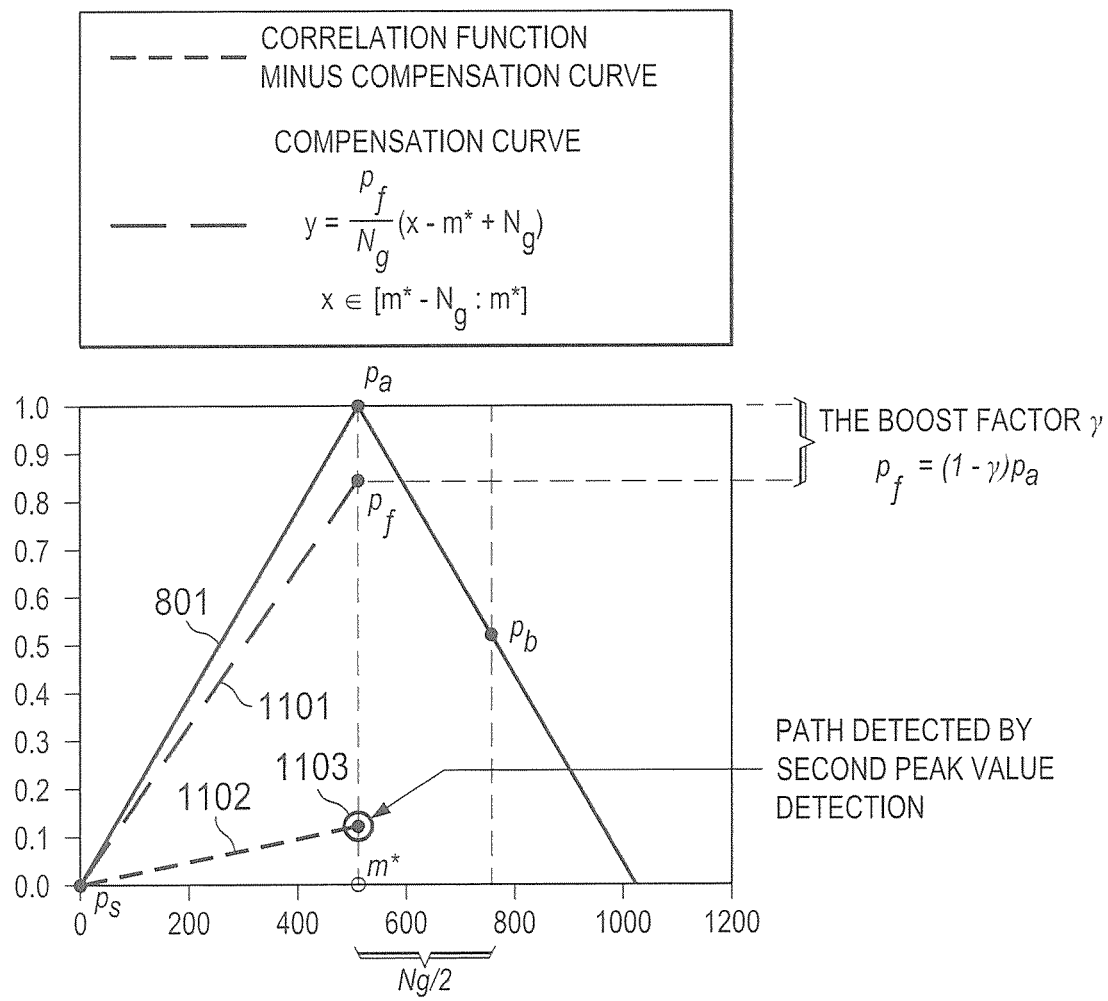

SYSTEM AND METHOD FOR TIME SYNCHRONIZATION OF OFDM-BASED COMMUNICATIONS

CROSS-REFERENCE TO RELATED APPLICATIONS

The present application is related to the following co-pending and commonly assigned United States patent applications: U.S. patent application Ser. No. 11/694,616 entitled "OFDM/OFDMA CHANNEL ESTIMATION" filed Mar. 30, 2007, and U.S. patent application Ser. No. 11/694,647 entitled "OFDM/OFDMA TIMING SYNCHRONIZATION USING NON-CONSECUTIVE PILOT SUBCARRIER ASSIGNMENTS," filed Mar. 30, 2007, the disclosures of which are hereby incorporated herein by reference.

TECHNICAL FIELD

The following description relates generally to determining timing synchronization between wireless communication stations and, more particularly, to performing double peak value detection in an orthogonal frequency-division multiplexing (OFDM) and/or orthogonal frequency division multiple access (OFDMA) system for reliably detecting a first-received path in a received OFDM symbol for use in timing synchronization.

BACKGROUND

Orthogonal frequency-division multiplexing (OFDM) is a method of digital modulation in which a signal is split into several narrowband channels at different frequencies. In some respects, OFDM is similar to conventional frequency-division multiplexing (FDM). The difference lies in the way in which the signals are modulated and demodulated. In general, priority is given to minimizing the interference, or crosstalk, among the channels and symbols comprising the data stream, while less importance is placed on perfecting individual channels.

OFDM-based communication is used in a wide variety of applications, including in European digital audio broadcast services, digital television, wireless local area networks, and is being considered as a method of obtaining high-speed digital data transmission over conventional telephone lines. OFDM systems have been widely used in high speed digital communication systems, such as VHDSL and ADSL since OFDM systems convert intersymbol interference (ISI) channels into ISI-free channels by inserting a cyclic prefix (CP) as an overhead of the data rate at the transmitter. Thus, OFDM is a widely-used technique for wireless and other types of communications.

In OFDM, data is transmitted in parallel over multiple equally spaced carrier frequencies using Fourier transform methods for modulation and demodulation. By inserting a guard period or guard interval, referred to as a cyclic prefix (CP), between symbols, data on OFDM subcarriers can be received orthogonally with no inter-carrier interference (ICI) and no intersymbol interference (ISI). Eliminating the ICI and ISI mitigates the effects of delay spread, making OFDM well-suited to wireless multipath channels. Moreover, for wireless channels, OFDM can be used with coding to easily exploit frequency diversity and combat Rayleigh fading to improve reliable information transfer.

OFDM-based systems, including orthogonal frequency division multiple access (OFDMA) systems, divide an available bandwidth into a plurality of orthogonal frequency subcarriers. Various subsets of the subcarriers may be assigned for use in communications, such as communications between particular stations. The particular subcarriers and the number of subcarriers assigned for use with respect to a communication may be based upon such considerations as the bandwidth or throughput to be provided by the radio link, interference mitigation or avoidance, etcetera. In an OFDMA system, multiple stations (e.g., subscriber stations) may be simultaneously provided communication links with a common access point (e.g., base station) or other station by simultaneously assigning different subsets of the subcarriers for the links of the multiple stations.

In OFDM and OFDMA communications, a signal is split into a number of sub-signals which are then transmitted simultaneously on different ones of the subcarriers. These separate subsignals may then be recombined by a receiving station to form the original signal for further processing etcetera.

Communication access is typically provided to the various stations through a defined protocol, such as may require access, resource allocation, authorization, and registration. It is common to use a ranging process as part of an access protocol in OFDM and OFDMA systems. In a typical ranging process, a subscriber station desiring access to network resources transmits a ranging code on a pre-specified set of subcarriers. That is, the subscriber station transmits a ranging code spread over multiple subcarriers which form the ranging subchannel. The ranging code may be a random or quasi-random code (e.g., code division multiple access (CDMA) chip code). The base station extracts the ranging code from the received signal and estimates the corresponding time delay. The time delay is used by the base station for transmission time delay estimation used with respect to downlink and uplink resources assigned to the subscriber station for further communications.

OFDM-based communication is well known in the art. A brief discussion thereof is provided herein, but the description of OFDM provided herein is not intended to limit the scope or applicability of the present invention in any way. An OFDM symbol has 2M+1 complex sinusoids modulated by complex modulation values $\{X(j)\}$, where j is the subcarrier index. The output OFDM symbol of length N samples, with time index k, is given by the N-point complex modulation sequence:

$$x(k) = \frac{1}{N} \sum_{j=-M}^{M} X(j) e^{j2\pi kj/N},$$

k=0, 1, 2, . . . , N−1; N≧2M+1. This process is efficiently carried out using an inverse DFT. The individual sinusoids are orthogonal on the useful interval of the symbol. For a sample interval of $T_s$, the separation of subcarriers is $1/N \cdot T_s$, and the useful period of the symbol is $T_u = N \cdot T_s$.

To mitigate against intersymbol interference (ISI), a cyclic prefix (CP), or guard interval, of Ng samples, is inserted before each symbol. The guard interval of $T_g = N_g \cdot T_s$ is generally chosen to exceed the largest expected multipath delay. The periodic nature of the DFT is exploited by making the guard interval a replica of the last $N_g$ symbols of the symbol. The transmitted symbol thus has $N_s = N + N_g$ samples.

In the multipath channel case, assume there are P+1 paths indexed as [0, 1, . . . , P]. The path amplitude of the p-th path is denoted as $\alpha_p$, and the path delay of the p-th path is denoted as $\theta_p$. The system frequency offset is denoted as $\epsilon$. The received signal r(k) can be written as: $r(k) = \Sigma \alpha_p s(k-\theta_p) e^{j2\pi\epsilon(k-\theta_p)/N} + n(k)$, where s(k) is the transmitted signal, n(k) is the additive white noise.

OFDM has superb robustness to ISI as a consequence of employing the CP. For adequate performance, an ISI free symbol is desired for presentation to the FFT process, and thus timing estimation becomes an important consideration in OFDM-based communication. Thus, it is well-known that OFDM-based systems demand strict timing and frequency synchronization between the transmitter and receiver. To avoid ISI, the receiver should adjust its symbol timing so that the symbol transitions occur within the cyclic prefixes between the symbols. In a multipath channel, the CP contains the symbol transitions under all signal paths. Also, being a multicarrier system, the OFDM receiver and transmitter should be tightly frequency synchronized in order to avoid ICI.

Several methods have been proposed for OFDM time and frequency synchronization. A number of timing synchronization algorithms have been proposed in the art, many of which exploit the correlation properties of the CP. As examples, various timing synchronization algorithms are proposed in the following references, the disclosures of which are hereby incorporated herein by reference:

1) J.-J. van de Beek, M. Sandell, and P. O. Borjesson, "ML estimation of time and frequency offset in OFDM systems," *IEEE Transactions, on Signal Processing*, vol. 45, no. 7, pp. 1800-1805, 1997;
2) C. Williams, M. A. Beach, and S. McLaughlin, "Robust OFDM timing synchronisation," *Electronics Letters*, vol. 41, no. 13, pp. 751-752, 2005;
3) T. M. Schmidl and D. C. Cox, "Robust frequency and timing synchronization for OFDM," *IEEE Transactions on Communications*, vol. 45, no. 12, pp. 1613-1621, 1997;
4) D. Landstrom, S. K. Wilson, J.-J. van de Beek, P. Odling, and P. O. Borjesson, "Symbol time offset estimation in coherent OFDM systems," *IEEE Transactions on Communications*, vol. 50, no. 4, pp. 545-549, 2002;
5) H. Minn, V. K. Bhargava, and K. B. Letaief, "A robust timing and frequency synchronization for OFDM systems," *IEEE Transactions on Wireless Communications*, vol. 2, no. 4, pp. 822-839, 2003;
6) M.-H. Hsieh and C.-H. Wei, "A low-complexity frame synchronization and frequency offset compensation scheme for OFDM systems over fading channels," *IEEE Transactions on Vehicular Technology*, vol. 48, no. 5, pp. 1596-1609, 1999;
7) B. Yang, K. B. Letaief R. S. Cheng, and Z. Cao, "Timing recovery for OFDM transmission," *IEEE Journal on Selected Areas in Communications*, vol. 18, no. 11, pp. 2278-2291, 2000;
8) K. Takahashi and T. Saba, "A novel symbol synchronization algorithm with reduced influence of ISI for OFDM systems," in *Proceedings of the IEEE Global Telecommunications Conference (GLOBECOM '01)*, vol. 1, pp. 524-528, San Antonio, Tex., USA, November 2001;
9) P. Liu, B.-B. Li, Z.-Y. Lu, and F.-K. Gong, "A novel symbol synchronization scheme for OFDM," in *Proceedings of the International Conference on Communications, Circuits and Systems*, vol. 1, pp. 247-251, Elong Kong, May 2005;
10) D. Lee and K. Cheun, "Coarse symbol synchronization algorithms for OFDM systems in multipath channels," *IEEE Communications Letters*, vol. 6, no. 10, pp. 446-448, 2002;
11) A. Palin, J. Pikkarainen, and J. Rinne, "Improved symbol synchronization method in OFDM system in channels with large delay spreads," in *Proceedings of the 1st International Symposium on Communication Systems and Digital Signal Processing (CSDSP '98)*, pp. 309-312, Sheffield, UK, April 1998;
12) Y.-L Huang, C.-R. Sheu, and C.-C. Huang, "Joint synchronization in Eureka 147 DAB system based on abrupt phase change detection," *IEEE Journal on Selected Areas in Communications*, vol. 17, no. 10, pp. 1770-1780, 1999;
13) A. Palin and J. Rinne, "Enhanced symbol synchronization method for OFDM system in SFN channels." in *Proceedings of IEEE Global Telecommunications Conference (GLOBECOM '98)*, vol. 5, pp. 2788-2793, Sydney Australia, November 1998;
14) S. H. Son and J. T. Kim, "A robust coarse symbol timing synchronization for OFDM systems in multi-path fading channel," in *Proceedings of the IEEE International Sympositum on Consumer Electronics 2008(ISCE 2008)*, pp. 1-3, Vilamoura, April 2008 (ISBN: 978-1-4244-2422-1); and
15) C. Williams, S. McLaughlin, and M. A. Beach, "Robust OFDM timing synchronisation in multipath channels," *EURASIP Journal on Wireless Communications and Networking*, vol. 2008, Article ID 675048, 12 pages, 2008 (revised Feb. 19, 2008, accepted Apr. 21, 2008).

However, the ability of the methods proposed in the above-mentioned references for providing accurate timing and frequency estimation in a wide range of multipath channels is limited, as discussed below.

As mentioned above, timing synchronization is important in OFDM-based systems. For such timing synchronization, a timing window should be acquired at the receive side for an OFDM system to get the correct time domain sampling points for FFT operation. Thus, a time synchronization process is employed to acquire the time window for the FFT operation.

As mentioned above, various techniques are known in the art for performing the timing synchronization. Certain known systems utilize pilot-assisted synchronization methods based on a number of different pilot synchronization signals. For instance, one known technique for timing synchronization is preamble based. For example, in 802.11 there is a dedicated preamble, which may be referred to as a "training sequence," that is used to perform the timing synchronization. Other systems do not use such a preamble for timing synchronization. So-called "blind" algorithms known in the art generally do not use any pilot training signals and typically exploit the correlation of the OFDM CP for timing synchronization. While blind methods are generally not wasteful of bandwidth on synchronization pilots, the synchronization accuracy is typically not as good as that attained using pilot-assisted methods. In certain continual transmission systems, such as the DVB-T, a dedicated preamble is not present, and so some embedded signals are used to perform the timing synchronization. For instance, such an embedded signal that may be used to perform the timing synchronization is the cyclic prefix (CP), which is the copy of the end of the OFDM signal boundary.

FIG. 1 shows an exemplary representation of a received OFDM symbol to illustrate the use of the embedded CP in a CP-correlation based method for performing the timing synchronization. Various mathematical variables are illustrated in FIG. 1, which are discussed further hereafter. As used herein, r(k) refers to the received OFDM signal that is received over time k; $N_g$ refers to the length (in time) of CP; N refers to the length (in time) of the OFDM body; Ns refers to the full OFDM symbol (that includes both the CP and the OFDM body); and m* refers to the starting sampling point of a full OFDM symbol (generally once m* is known, the [m*+Ng: m*+Ng+N−1] can be used to perform FFT operation).

Thus, the illustrated bar in FIG. 1, labeled r(k), represents the received OFDM symbol, which is shown with preceding dots and succeeding dots that represent other OFDM symbols that may be received over time.

As shown in FIG. 1, the CP represents the OFDM symbol boundary. In general, the CP of the OFDM symbol is exactly the same as the ending portion of the OFDM body. In the CP-correlation based timing synchronization technique, an algorithm is employed to perform a correlation between two windows. So, the system continues to receive a signal, and the correlation technique continues to perform the CP correlation. When the signal is received, it is buffered. Then, the CP-correlation technique performs correlation between the CP and the ending portion of the OFDM body, which generally reside at head of the buffer and the end of the buffer and are exactly one of the symbols apart. Because the CP and the ending portion of the OFDM body are the same, the correlation should ideally result in a peak power to be detected by a peak detector. Thus, the CP-correlation method is one technique for determining a timing window for sampling points for FFT operation.

FIG. 2 further illustrates an example of performing the traditional CP-correlation method. As illustrated, the CP correlation function, cor(m), performed on the received signal r(k) performs correlation between two $N_g$ length sliding windows that are N delay apart. The output of the CP correlation function (cor(m)) performed on the received signal r(k) is shown as output 201 in FIG. 2. The output 201 of the correlation function has a substantially triangular shape in time domain with $2*N_g$ width. That is, over time $2*N_g$, the power value of the correlation output signal 201 gradually increases until it peaks (at time point m*), and then gradually decreases, thereby forming the substantially triangular shape illustrated in FIG. 2 with the time axis forming the base of the triangle, the rising (or increasing) edge of the output signal 201 forming a second side of the triangle, and the falling (or decreasing) edge of the output signal 201 forming the third side of the triangle. As shown in FIG. 2, the correlation output 201 approaches its maximum (or peak) value at the OFDM symbol boundary due to the replica property between CP and the tail part of the OFDM body. As shown in FIG. 2, the peak value of correlation output 201 is repeated every OFDM symbol duration.

Generally speaking, there often exists more than one path received in an OFDM signal. That is, OFDM systems often have a multiple path transmission. So, multiple paths may be received, and in order to decode the OFDM signal correctly, it becomes desirable to detect the first-received path. Prior ranging processes have merely relied upon peak detection with respect to the received ranging signal. However, the peak often does not correspond to the first path (i.e., the first path is often not the strongest path). Establishing time delay based upon the ranging signal as received in other than the first path results in improper timing and may cause undesired signal characteristics such as inter-symbol interference (ISI). That is, if the timing is determined by the maximum triangular power signal detected and the first path is not the strongest path, part of the cyclic prefix of the next symbol will be included in the FFT window of the current symbol. Thus, ISI will be generated due to wrong timing. Accordingly, traditional ranging signal time delay determination based solely on peak value detection is less than optimal.

As illustrated in FIG. 3, multiple copies of signals may be received with different delay in the multipath propagation environment. For instance, signals 301-303 are illustrated as being received with different delay in the exemplary, multipath propagation environment of FIG. 3. FIG. 3 goes on to illustrate that it is generally desirable to perform the timing synchronization with the first path (as illustrated by timing synchronization 304) so as to avoid ISI. For instance, the exemplary timing synchronization 305 with the second path results in ISI caused by the first path in the illustrated example of FIG. 3. Therefore, FIG. 3 illustrates that it is generally desirable to acquire the first path in order to avoid ISI.

FIG. 4 illustrates an exemplary application of the traditional CP correlation technique when applied to a multipath propagation environment such as that of FIG. 3. The peak value detection can only detect the path with the largest power, rather than detecting the first path. When the traditional CP correlation function (as discussed above with FIG. 2) is applied to the received multipath signal 401 in FIG. 4, the correlation function output 402 produces a peak value 403 that does not correspond to the first path of the received signal 401. Multipath signal 401 is received, which in this example includes paths 410, 411, and 412. The first path 410 is received first in time, the second path 411 begins second in time, and the third path 412 begins third in time within the received multipath signal 401. As discussed further below, application of the traditional CP correlation function to the received multipath signal 401 in FIG. 4 results in detection of a peak value 403 that does not correspond to the first path 410 of the received signal 401.

The CP correlation function in the multipath environment is a superposition of multiple triangles that each corresponds to one path in the received signal 401. For instance, a first triangular correlation contribution 404 corresponds to the first path 410 in the received signal 401, wherein the first triangular contribution 404 has its peak value 407 coinciding with the boundary of the first path 410 in the received signal 401. A second triangular correlation contribution 405 corresponds to the second path 411 in the received signal 401, wherein the second triangular contribution 405 has its peak value 408 coinciding with the boundary of the second path 411 in the received signal 401. And, a third triangular correlation contribution 406 corresponds to the third path 412 in the received signal 401, wherein the third triangular contribution 406 has its peak value 409 coinciding with the boundary of the third path 412 in the received signal 401. The different triangular contributions 404, 405, and 406 all contribute to the correlation output 402. Generally the triangular contributions 404-406 are summed to produce the resulting correlation output 402 that is monitored by the peak detector. As such, the contributing triangular contributions 404-406 are effectively embedded within the resulting correlation output 402. While triangular contributions 404-406 are illustrated individually in FIG. 4, it should be understood that these contributions are generally not individually known (or detected) but are instead merely embedded as contributing components within correlation output 402. Thus, in the example illustrated in FIG. 4, the peak detector detects peak 403, which in this example coincides with the boundary of the second path 411, rather than the first path 410.

Accordingly, a problem becomes how to accurately detect the first-received path (e.g., path 410) in a multipath environment. In other words, it becomes desirable to detect the peak value 407 of the triangular contribution 404 that corresponds to the first path 410.

In view of the above, the traditional CP correlation method for OFDM timing synchronization is not robust in a multipath environment when the strongest multipath components are delayed relative to the first arriving paths. One technique that has been proposed for attempting to detect the first-received path is illustrated with FIGS. 5A-5D. See e.g., C. Williams, S. McLaughlin, and M. A. Beach, "Robust OFDM timing synchronisation in multipath channels," *EURASIP Journal on Wireless Communications and Networking*, vol. 2008, Article ID 675048, 12 pages, 2008 (revised Feb. 19, 2008, accepted Apr. 21, 2008). The technique illustrated in FIGS. 5A-5D is referred to herein as the "largest slope" detection method.

This largest slope detection method operates on the principle that the slope of the correlation curve increases before the first path and starts to decrease after the first path. Thus, the end of the segment of the correlation curve with the largest slope is detected as coinciding with the peak of the first path, as illustrated in FIGS. 5A and 5B. For instance, FIG. 5A shows an example in which there are two correlation "triangular" contributions 501 and 502 that correspond, respectively, to a first-received path and second-received path that are included in a received signal (such as paths 410 and 411 in the example of FIG. 4 discussed above). FIG. 5A shows an example in which the power of the peak 505 of the correlation "triangular" contribution 501 for the first path is greater than the peak of the correlation "triangular" contribution 502 for the second path. The resulting CP correlation output has a curve having a segment 503A with a first slope and a segment 503B with a different slope. The slope of the first segment 503A increases, and then at point 504 the slope starts decreasing for segment 503B. As can be seen in FIG. 5A, the point 504 at which the slope of the CP correlation output curve begins decreasing corresponds to the peak 505 of the correlation "triangular" contribution 501 for the first path. Thus, by employing the largest slope detection method to detect point 504, the peak 505 of the correlation "triangular" contribution 501 for the first path in a received signal may be detected.

FIG. 5B shows another example in which there are two correlation "triangular" contributions 521 and 522 that correspond, respectively, to a first path and second path that are included in a received signal (such as paths 410 and 411 in the example of FIG. 4 discussed above). FIG. 5B shows an example in which the power of the peak 525 of the correlation "triangular" contribution 521 for the first path is less than the peak of the correlation "triangular" contribution 522 for the second path. The resulting CP correlation output has a curve having a segment 523A with a first slope and a segment 523B with a different slope. The slope of the first segment 523A increases, and then at point 524 the slope is decreased for segment 523B. As can be seen in FIG. 5B, the point 524 at which the slope of the CP correlation output curve decreases corresponds to the peak 525 of the correlation "triangular" contribution 521 for the first path. Thus, by employing the largest slope detection method to detect point 524, the peak 525 of the correlation "triangular" contribution 521 for the first path in a received signal may be detected.

However, the determination of the largest slope is extremely difficult due to the noisy feature of the practical correlation curve. For instance, FIG. 5C illustrates an example of a CP correlation curve 530 that may be produced in practical application in a real-world system. As shown in the enlarged portion 530A in the example of FIG. 5C, the largest slope method may lead to a false detection of the first path at an erroneous point 531 due to noise that is present in the system. That is, due to noise, the largest slope observed in the CP correlation output may not coincide with the peak of the first triangular output for the first path. Particularly if the time window over which the correlation slope is being evaluated is quite small, then the noise may greatly affect the determination of the slope. So, FIG. 5C illustrates that if the gradient of the correlation curve 530 is determined at very small windows, then the largest slope is possibly detected at some random point, such as point 531 shown in FIG. 5C. Because of this sensitivity to noise the largest slope method requires use of a lot of filtering technologies. As a result, the largest slope method is undesirably difficult to implement and/or its results are not as dependable as may be desired. For instance, FIG. 5D shows a block diagram of the complicated structure 540 that is used for performing the largest slope synchronization method, as described further in C. Williams et al. "Robust OFDM timing synchronisation in multipath channels" cited above.

SUMMARY

In view of the above, the inventors of the present application have recognized a desire for an improved CP correlation-based timing synchronization method that is robust and/or simpler to implement than the traditional methods. The inventors of the present application have recognized a desire for a system and method for detecting an early path (e.g., first-received path) in a received OFDM-based communication that is more robust and/or simpler to implement than the above-described methods, such as the above-described largest slope method.

The present invention is directed generally to a system and method for time synchronization of OFDM-based communications. Systems and methods are disclosed for performing double peak value detection in an OFDM-based system for reliably detecting an early (e.g., first-received) path in a received OFDM symbol for use in timing synchronization.

As described further herein, a new CP correlation-based timing synchronization method is disclosed for early path (e.g., first-received path) detection for OFDM-based communication. In certain embodiments, a double peak value detection method is employed. In the double peak value detection method, a first peak value detection is performed to detect the path with the largest power, and a second peak value detection is then performed to detect a desired early (e.g. first-received) path. A compensation linear curve is used to facilitate the second peak value detection. The compensation linear curve is designed based on the information obtained in the first peak value detection. For instance, information obtained in the first peak value detection that may be used includes the peak value, the timing position of the peak value, and the correlation value at half of CP length after the peak position. In certain embodiments, a boost factor is used for bias purposes.

Thus, embodiments of the present invention provide new systems and methods for reliably performing timing synchronization in OFDM-based systems, such as OFDM and OFDMA systems. According to embodiments of the present invention, a new technique is provided for accurately detecting a first path in a received multipath OFDM symbol. In general, according to certain embodiments, a compensation curve is generated to remove the effects of later-received paths in order to result in a correlation output that reliably detects the first-received path. As such, timing synchronization can be accurately performed using the timing determined for the OFDM symbols in the detected first path.

One embodiment is referred to herein as the double peak value detection method. In the double peak value detection method, the traditional peak value detection method is first performed for a received OFDM signal to obtain a first time reference point, $m^*$, as discussed above with FIG. 2. As discussed above with FIG. 4, such traditional peak value detection may not accurately detect the first-received path, particularly when a later-received path is stronger. Thus, in the double peak value detection method, a compensation curve is then generated. The compensation curve effectively counteracts the effect (or contribution to the correlation output) of the rising edge of the triangular correlation contribution associated with the path detected by m*. The compensation curve corresponds to the rising edge of the triangular correlation contribution associated with the detected path in interval [m*−$N_g$:m*]. The (generated compensation curve is subtracted from the correlation output in interval [m*−$N_g$: m*], and a second peak value detection is then performed to obtain a second time reference point, m. As discussed further herein, the second time reference point, m accurately detects the first-received path.

As also discussed further herein, in certain embodiments, this process is implemented in a universal algorithm that can be applied across various different scenarios for accurately detecting the first path in each scenario. For instance, the universal algorithm can be applied for accurately detecting: 1) a single path in a received symbol having only the single path; 2) a first path in a received symbol that has two paths having arbitrary delay between [0:$N_g$] and peak power associated with the first path (p1) is greater than peak power associated with the second path (p2) (in other words, the first path is stronger than the second path); 3) a first path in a received symbol that has two paths where the peak power associated with the first path (p1) is less than the peak power associated with the second path (p2) (in other words, the second path is stronger than the first path) and the paths are separated in time by an arbitrary delay between [0:$N_g$/2]; and 4) a first path in a received symbol that has two paths where the peak power associated with the first path (p1) is less than the peak power associated with the second path (p2) (in other words, the second path is stronger than the first path) and the paths are separated in time by an arbitrary delay between [$N_g$/2:$N_g$]. In certain embodiments, a boost factor is implemented for aiding the universal algorithm in reliably detecting the first path across all of the above-mentioned case scenarios.

Thus, in certain embodiments, the double peak detection method may be implemented within a universal algorithm that can be applied for accurate time synchronization in any of various different cases that may be encountered in an OFDM-based communication system. Thus, a priori knowledge about the OFDM-based symbols being processed, such as whether the received OFDM signal contains a single path or multiple paths, is not required. Further, the double peak detection method is less sensitive to noise than the largest slope method, and is thus more robust in practical applications and/or simpler and less expensive to implement than the largest slope method.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 8 shows a graph illustrating an example of CP correlation for an OFDM-based communication that has a single path;

FIG. 9 shows a graph illustrating an example of CP correlation for an OFDM-based communication that has two paths with arbitrary delay between [0:$N_g$] and where p1>p2;

FIG. 10A shows a graph illustrating an example of CP correlation for an OFDM-based communication that has two paths with p1<p2 and having an arbitrary path delay between [0:$N_g$/2];

FIG. 10B shows a graph illustrating an example of CP correlation for an OFDM-based communication that has two paths with p1<p2 and having an arbitrary path delay between [$N_g$/2:$N_g$];

FIG. 11 shows a graph illustrating an example of a compensation curve that is employed for determining a second correlation curve, where the peak of the second correlation curve is used for detecting a first-received path for the exemplary case of FIG. 8;

DETAILED DESCRIPTION

As discussed above, timing synchronization is important in OFDM-based systems, such as OFDM and OFDMA systems. The traditional CP correlation methods that have been employed for OFDM timing synchronization are not robust in multipath environments, particularly when the strongest multipath components are delayed relative to the first arriving path. Thus, a desire has arisen for more robustly detecting the first arriving path.

As mentioned above, the largest slope detection method has recently been proposed for detecting the first arriving path in a received multipath OFDM symbol, see C. Williams et al. "Robust OFDM timing synchronisation in multipath channels" cited above. However, the determination of the largest slope is extremely difficult due to the noisy feature of the correlation curve in practical applications (e.g., in real-world systems), which diminishes the reliability of this technique in the presence of noise and/or requires complex filtering technologies for its implementation. As a result, the largest slope method is undesirably difficult and expensive to implement and/or its results are not as dependable as may be desired.

Embodiments of the present invention provide new systems and methods for reliably performing timing synchronization in OFDM-based systems, such as OFDM and OFDMA systems. According to embodiments of the present invention, a new technique is provided for accurately detecting a first path in a received multipath OFDM symbol. In general, according to certain embodiments, a compensation curve is generated to remove the effects of later-received paths in order to result in a correlation output that reliably detects the first-received path. As such, timing synchronization can be accurately performed using the timing determined for the OFDM symbols in the detected first path.

Figure 1:
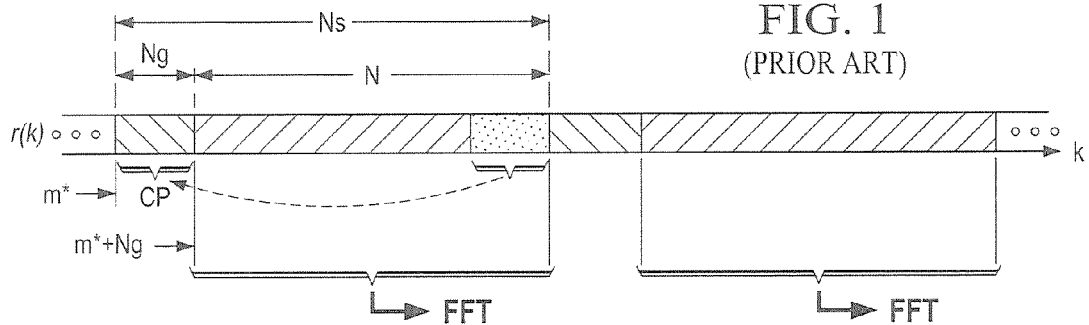
FIG. 1 shows an exemplary representation of a received OFDM symbol with cyclic prefixed (CP) filled in the guard interval.
Figure 2:
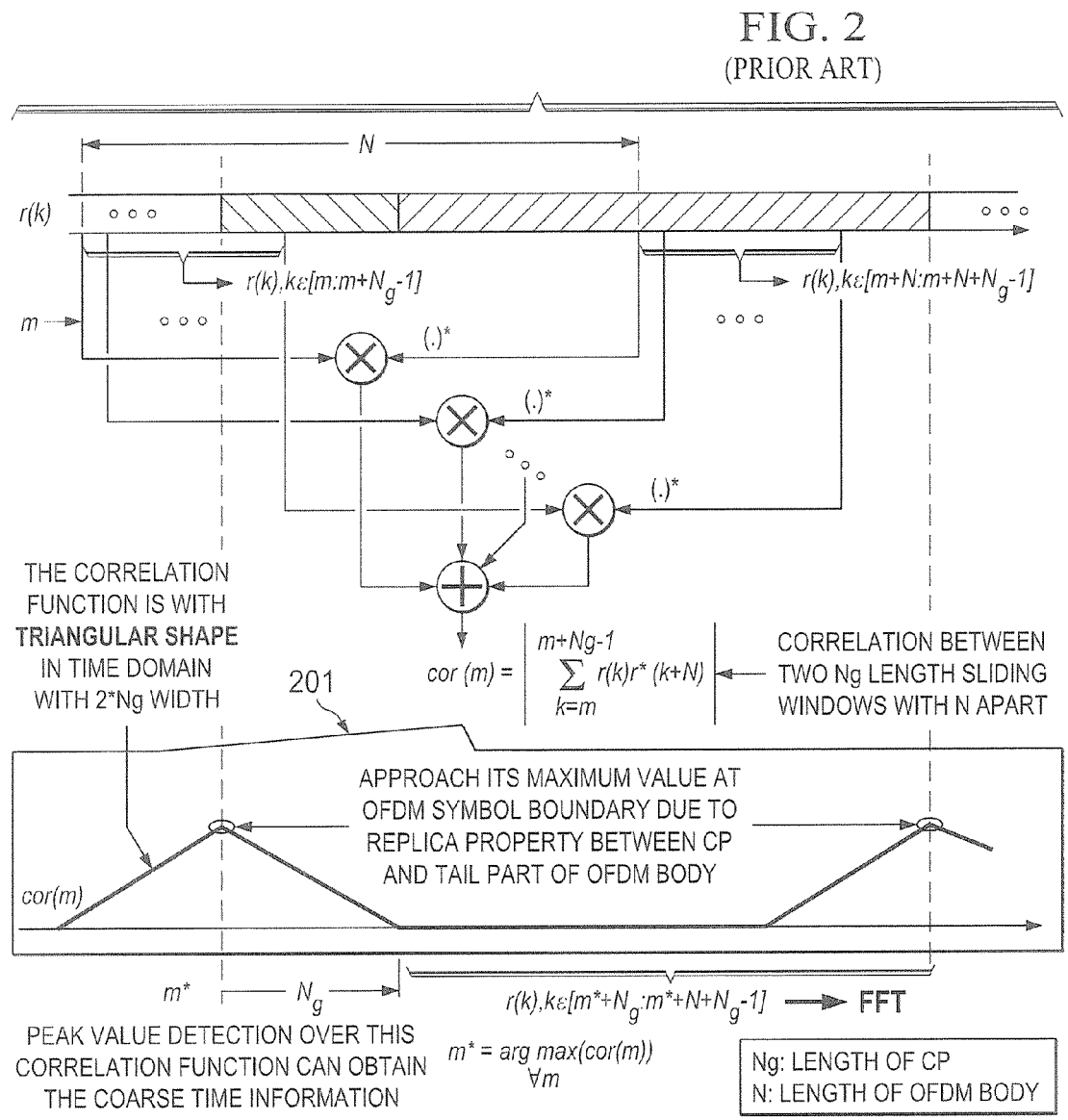
FIG. 2 further illustrates an example of performing the traditional CP-correlation method on the exemplary OFDM symbol of FIG. 1.
Figure 4:
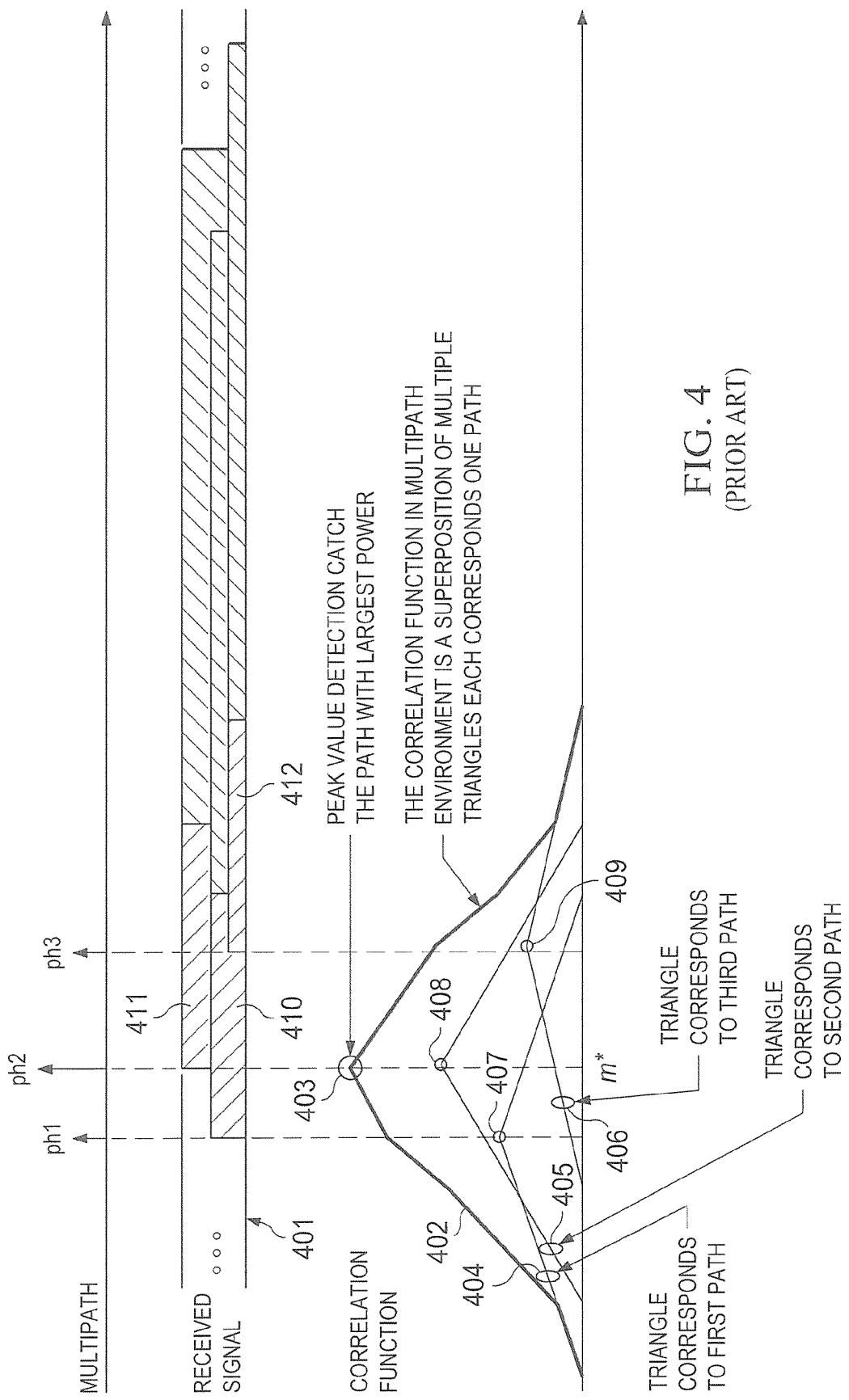
FIG. 4 illustrates an exemplary application of the traditional CP correlation technique when applied to a multipath propagation environment such as that of FIG. 3.
Figure 5A:
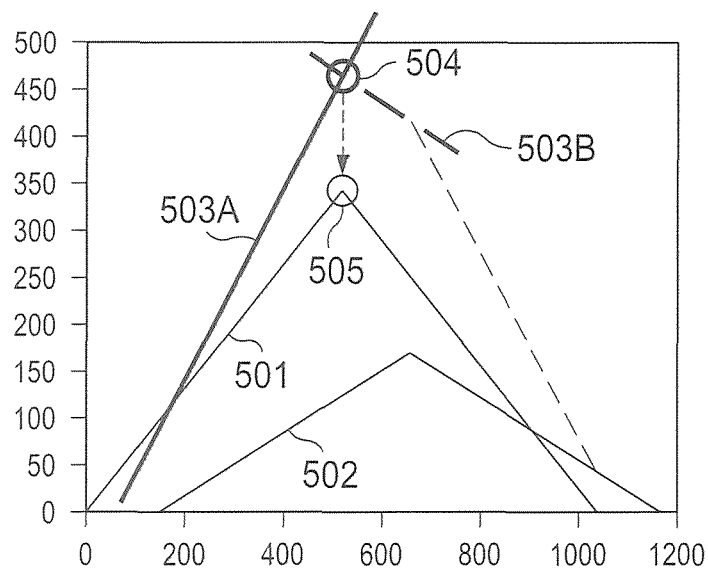
FIGS. 5A-5D show an exemplary One technique that has been proposed for attempting to detect the first-received path is illustrated with FIGS. 5A-5D.
Figure 5B:
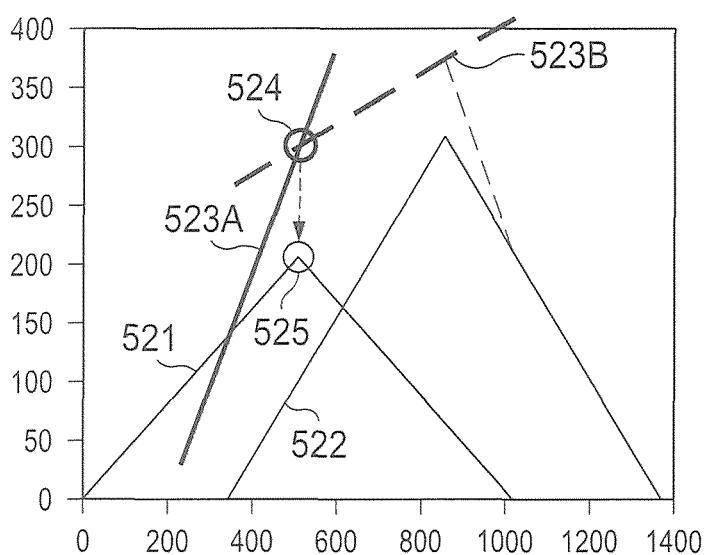
Figure 5C:
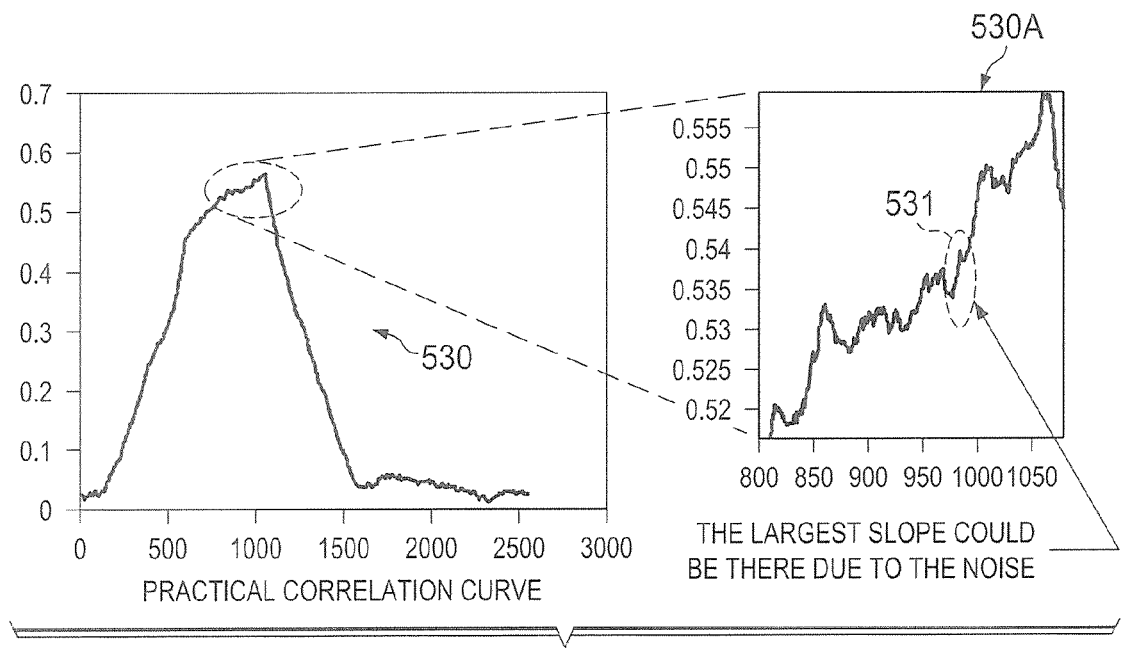
Figure 5D:
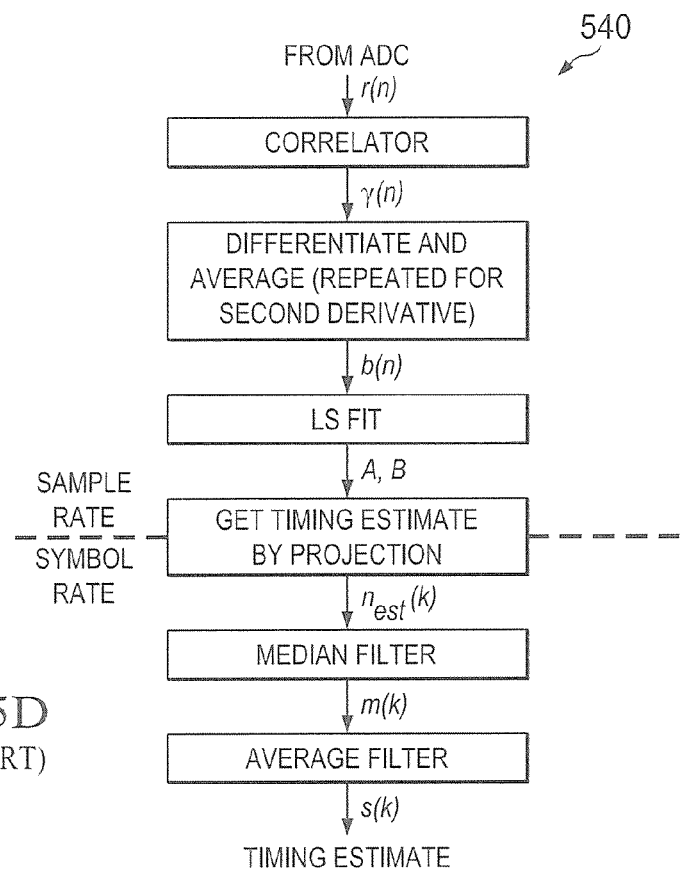

One embodiment is referred to herein as the double peak value detection method. In the double peak value detection method, the traditional peak value detection method is first performed for a received OFDM signal to obtain a first time reference point, m*, as discussed above with FIG. 2. As discussed above with FIG. 4, such traditional peak value detection may not accurately detect the first-received path, particularly when a later-received path is stronger. Thus, in the double peak value detection method, a compensation curve is then generated. The compensation curve effectively counteracts the effect (or contribution to the correlation output) of the rising edge of the triangular correlation contribution associated with the path detected by m*. The compensation curve corresponds to the rising edge of the triangular correlation contribution associated with the detected path in interval $[m*-N_g:m*]$. The generated compensation curve is subtracted from the correlation output in interval $[m*-N_g:m*]$ and a second peak value detection is then performed to obtain a second time reference point, m. As discussed further herein, the second time reference point, m accurately detects the first-received path.

As also discussed further herein, in certain embodiments, this process is implemented in a universal algorithm that can be applied across various different scenarios for accurately detecting the first path in each scenario. For instance, the universal algorithm can be applied for accurately detecting: 1) a single path in a received symbol having only the single path; 2) a first path in a received symbol that has two paths having arbitrary delay between $[0:N_g]$ and peak power associated with the first path (p1) is greater than peak power associated with the second path (p2) (in other words, the first path is stronger than the second path); 3) a first path in a received symbol that has two paths where the peak power associated with the first path (p1) is less than the peak power associated with the second path (p2) (in other words, the second path is stronger than the first path) and the paths are separated in time by an arbitrary delay between $[0:N_g/2]$; and 4) a first path in a received symbol that has two paths where the peak power associated with the first path (p1) is less than the peak power associated with the second path (p2) (in other words, the second path is stronger than the first path) and the paths are separated in time by an arbitrary delay between $[N_g/2:N_g]$. In certain embodiments, a boost factor is implemented for aiding the universal algorithm in reliably detecting the first path across all of the above-mentioned case scenarios.

Thus, in certain embodiments, the double peak detection method may be implemented within a universal algorithm that can be applied for accurate time synchronization in any of various different cases that may be encountered in an OFDM-based communication system. Thus, a priori knowledge about the OFDM-based symbols being processed, such as whether the received OFDM signal contains a single path or multiple paths, is not required. Further, the double peak detection method is less sensitive to noise than the largest slope method, and is thus more robust in practical applications and/or simpler and less expensive to implement than the largest slope method.

Figure 6A:
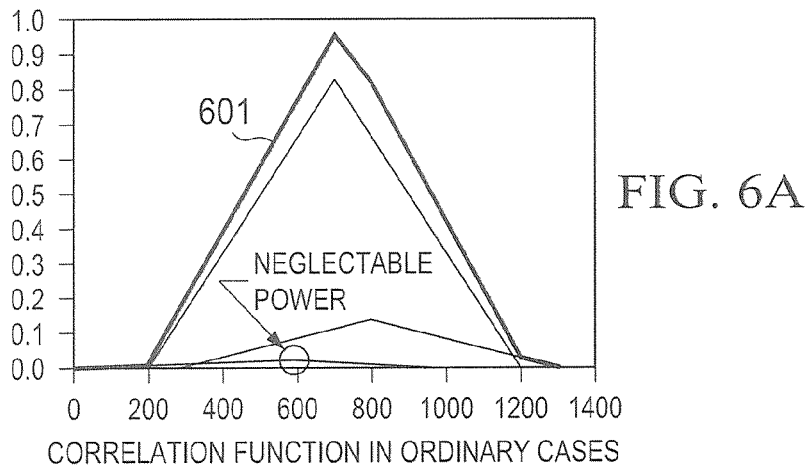
FIGS. 6A-6C show graphs illustrating various relationships between a first-received path and later-received paths that may be encountered in an OFDM-based communication.
Figure 6B:
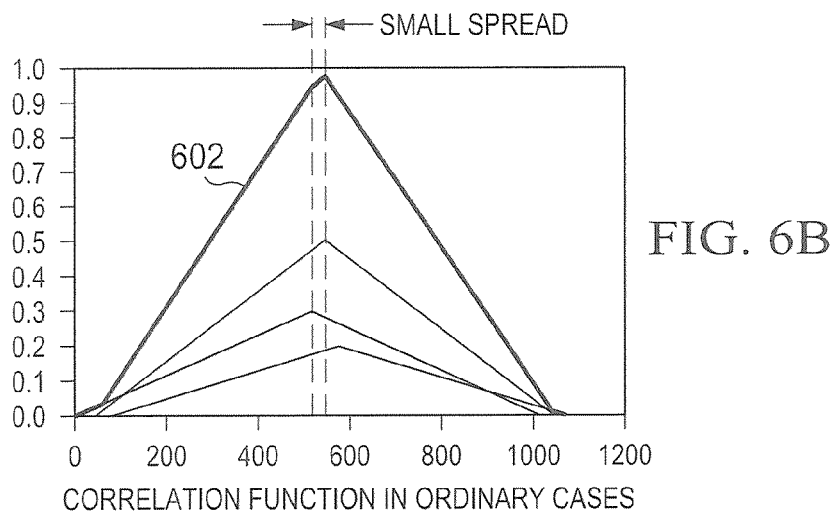

In some cases, the first path in a received multipath OFDM symbol is relatively close in time to a later-received path that is stronger, such that the peak value detection method may still work sufficiently well for detecting the first path. In most cases, the peak value detection method may work acceptably well when the following factors are present: 1) the power of early paths is small enough such that the ISI is neglectable, and/or 2) the delay spread of the multipath channel is relatively small (compared with CP length) such that the early paths are within the search range of next step fine timing synchronization. In either of these instances, the paths can actually be treated as one cluster which corresponds to one semi-triangle correlation function as shown in FIGS. 6A-6B. As shown in the example of FIG. 6A, when the power of the first-received path is small enough as to be neglectable, then that path may be treated as noise. As shown in FIG. 6B, when the first path is of non-neglectable power but is close enough in time to a later-received path of larger power, then those paths may be treated as one single path. Thus, in either of the situations reflected in FIGS. 6A and 6B, the peak value detection method employed for CP correlation may be used, if so desired, for certain environments. Thus, the peak value detection of the correlation curves 601 and 602 of FIGS. 6A and 6B, respectively, may be utilized in certain environments for timing synchronization.

Figure 6C:
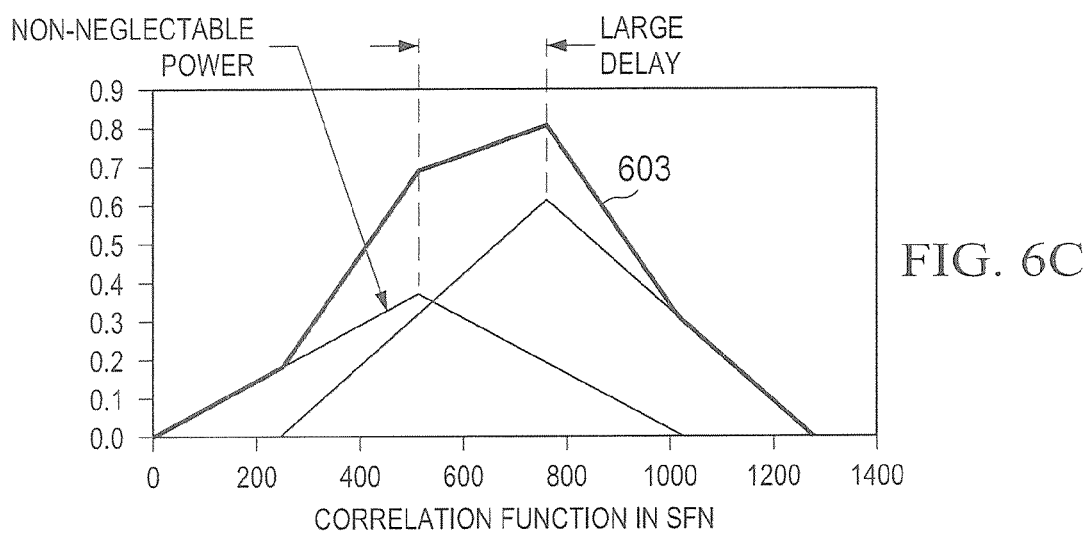

However, this is not the case in certain environments, such as in a Single Frequency Network (SFN), where there are clusters with comparable power and relatively large delay spread. In those environments, there exists a need to accurately detect the first path (or cluster). In situations, such as illustrated in FIG. 6C in which the first path is of non-neglectable power and has a sufficiently large separation distance from a later-received path having the largest power, then it may be necessary to detect the first path. FIG. 6C illustrates an example of a situation in which the power of the first-received path is non-neglectable and it is sufficiently separated (by some non-neglectable amount of delay) from a later-received path having the largest power. In this situation, it becomes desirable for a technique to accurately detect the first-received path, as the peak value detection of the resulting correlation curve 603 fails to detect the first-received path. However, the existence of whether a given OFDM-based communication falls under the scenario of FIG. 6A or 6B may not be detectable in practical application (e.g., in a real-world system), and thus it generally becomes desirable for a technique that provides an accurate result in any of the cases illustrated in FIGS. 6A-6C.

Figure 7:
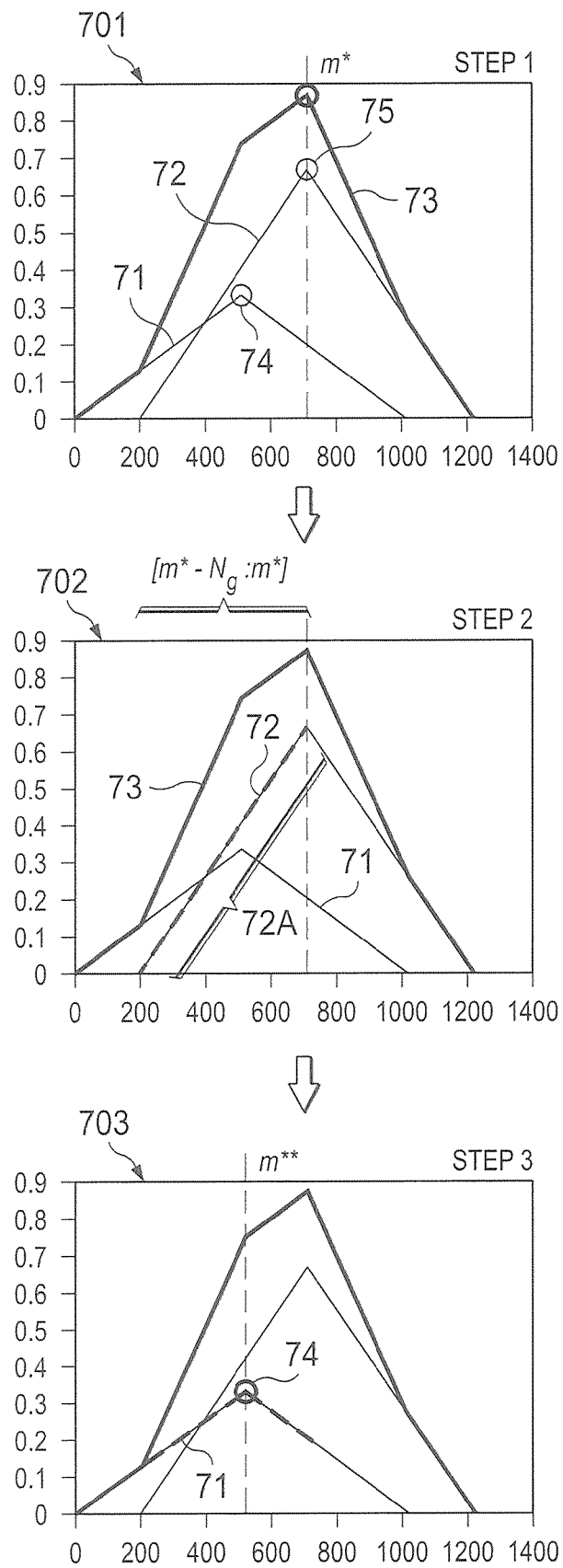
FIG. 7 shows an exemplary operational flow for a double peak value detection method according to one embodiment of the present invention.

Certain embodiments of the present invention provide a technique for removing the effects of paths occurring after the first-received path. One embodiment of such technique is referred to herein as the double peak value detection method. An exemplary operational flow for such double peak value detection method is shown in FIG. 7. In the example illustrated in FIG. 7, a multipath signal is received that has multiple paths (e.g., two paths are considered for ease of illustration and discussion). As shown in graph 701 of FIG. 7, a first triangular CP correlation contribution 71 corresponds to the first-received path, and a second triangular CP correlation contribution 72 corresponds to the second-received path. In the considered example, the second triangular CP correlation contribution 72 has a larger peak value 75 than the peak value 74 of the first triangular CP correlation contribution 71. However, the first peak value 74 may be of non-neglectable power and the delay between the peak values 74 and 75 is relatively large. Thus, the illustrated example of FIG. 7 falls within the exemplary case of FIG. 6C discussed above, wherein it becomes important to detect the first-received path for proper timing synchronization (e.g., to avoid ISI).

Figure 3:
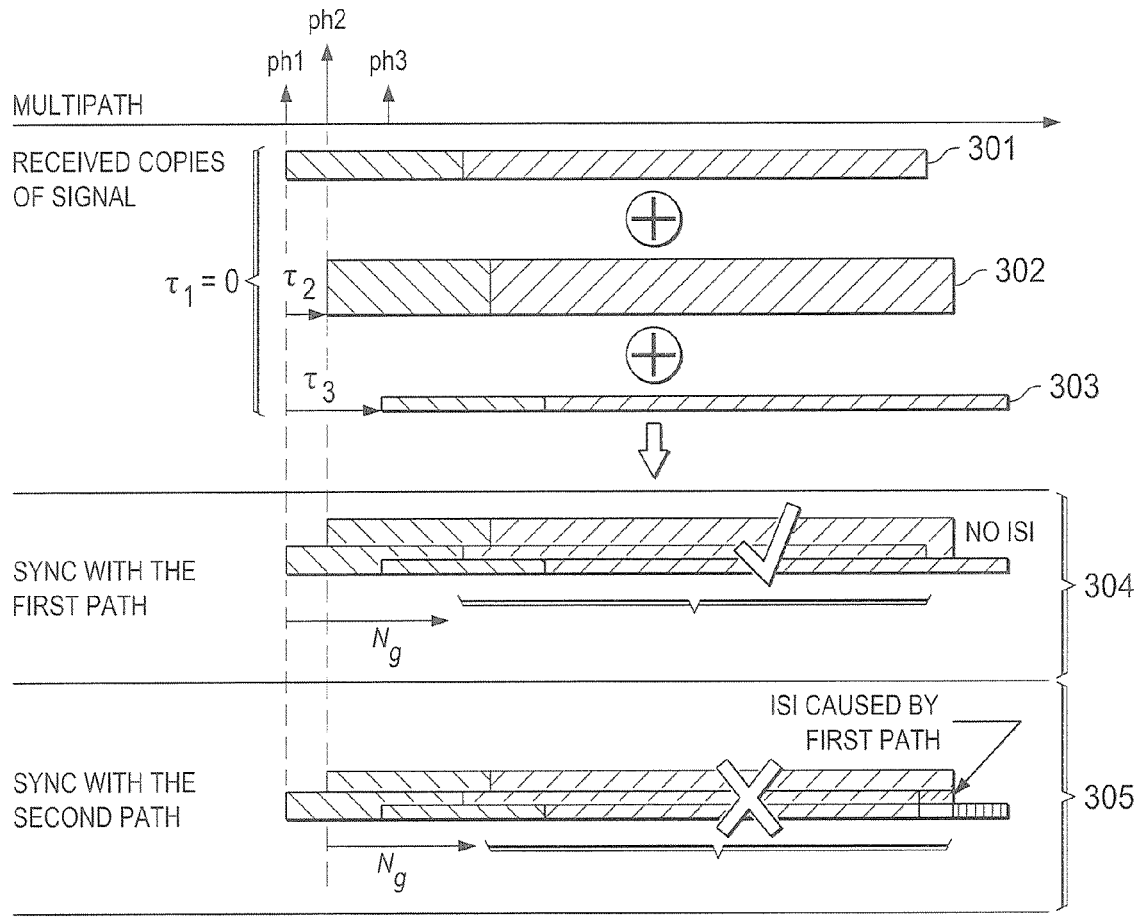
FIG. 3 illustrates an exemplary multipath propagation, showing that it is generally desirable to perform timing synchronization based on a first-received path to avoid ISI.

According to the double peak value detection method, the ordinary peak value detection (as discussed above with FIGS. 2-4) is first performed, wherein the peak value of the CP correlation curve 73 is evaluated to determine m*, as shown in the exemplary graph 701. As discussed above with FIG. 4, this first peak value detection detects the path with the largest power, which may not be the first-received path. Indeed, in the illustrated example of FIG. 7, the peak value m* of the CP correlation curve 73 corresponds to the peak 75 of the correlation contribution associated with the second-received path, rather than the first-received path as shown in graph 701.

Then, according to the double peak value detection method, a compensation linear curve is generated corresponding to the rising edge of the triangular correlation contribution of the detected path in interval $[m^*-N_g:m^*]$. As shown in the exemplary graph 702 of FIG. 7, a compensation linear curve is generated for the rising edge 72A of the triangular correlation contribution of the path 72 that was detected in the first peak value detection step (shown in graph 701) in interval $[m^*-N_g:m^*]$.

Then, according to the double peak value detection method, the generated compensation curve is subtracted from the correlation output 73 in interval $[m^*-N_g:M^*]$, and a second peak value detection is performed over the interval $[m^*-N_g:m^*]$ to obtain m. As shown in the exemplary graph 703 of FIG. 7, the second peak value, m, corresponds to the peak value 74 of the cor elation contribution 71 associated with the first path. Thus, while the ordinary peak value detection of m* detects the second path in the illustrated example of FIG. 7, the further steps performed in the double peak value detection method results in the double peak value detection of m**, which detects the first path, as desired.

The above-described double peak value detection method of FIG. 7 is quite robust. The double peak value detection method is less sensitive to noise than the above-mentioned largest slope detection method of FIGS. 5A-5D, thereby making it potentially more attractive for various practical applications.

In general, there are basically three scenarios encountered by the correlation functions:
Case 1: single path;
Case 2: two paths with arbitrary delay between $[0:N_g]$, and p1>p2; and
Case 3: two paths with p1<p2, which are further classified into two subcases:
  Subcase A: with arbitrary path delay between $[0:N_g/2]$, and
  Subcase B: with arbitrary path delay between $[N_g/2:N_g]$.
Each of the above cases and subcases are considered further below. FIG. 8 shows a graph illustrating an example of Case 1, the single path case. FIG. 9 shows a graph illustrating an example of Case 2, the multi-path case with arbitrary delay between [0:Ng], and p1>p2. FIG. 10A shows a graph illustrating an example of Case 3, Subcase A. FIG. 10B shows a graph illustrating an example of Case 3, Subcase B. Each of these FIGURES are discussed further below.

It should be noted that in a practical system, the multipath situation is often quite complicated. There could be any number of paths with any possible delay spread and power distribution in a given system. However, in certain embodiments described herein, we assume that this complicated practical multipath situation can be classified and approximated by three cases (Case 1, Case 2, Case 3 with up to two single paths for analysis). For example, as discussed with the example of FIG. 6, the practical multipath situations in FIGS. 6A and 6B can actually be classified as Case 1 (single path) in one embodiment of the algorithm proposed herein. As a result, it is assumed in certain embodiments that there are at most two clusters of multipath in the system and each cluster can be treated as one single path in our algorithm (because the correlation curve of each cluster is quite similar to the triangle as long as the paths within one cluster is sufficiently close to each other).

In a real system, there could be some seldom situations in which the assumed two single paths model is not quite appropriate. For example, three clusters of multipath with almost equal power and large enough delay spread may exist in some instances. However, the proposed solution of the embodiment is sufficiently robust for several reasons. First, these situations in which the assumed two single paths model is not quite appropriate occur quite seldom. Furthermore, these situations can be detected as one of the three cases in the proposed algorithm and be processed in a corresponding way to give out the first path detection. Even though it may not give the exact first path in these situations, it can bring the actual first path into the search range of following fine timing search module. Computer simulation can be used to test the performance of the proposed algorithm in these relatively rare situations.

The various different exemplary cases and subcases are analyzed below (with reference to FIGS. 8-14) to illustrate how, for the different cases, the compensation curve of step 2 of the double peak value detection method of FIG. 7 can be calculated. Then, according to one embodiment, the methodologies are summarized into one universal formula that may be universally applied across all scenarios for accurate detection of the first-received path (for use in timing synchronization) in any of the various different cases/subcases. That is, a universal formula is derived that, according to certain embodiments, may be applied universally, across all of the different cases and subcases that may be encountered.

In real time, it may be unknown how many paths have been received in the receive side of an OFDM-based system (e.g., an OFDMA system). Thus, it may be unknown in any given environment which of the above-mentioned cases/subcases is being encountered. So, in the first case (Case 1), it is assumed that there is only one path that has been received. An example of this case is illustrated in the graph of FIG. 8. In FIG. 8, there is shown $p_a$ and $p_b$, which refers to power a and power b. The $p_a$ and $p_b$ values may be derived as follows:

$$p_a = cor(m^*) \text{ and } p_b = cor\left(m^* + \frac{N_g}{2}\right).$$

$p_a$, in this instance, is the peak value of the CP correlation output triangle 801. $P_b$ is the correlation value (of output triangle 801) at a time following m* (at which $p_a$ occurred) by an amount which is half of $N_g$. It should be recalled that $N_g$ is the length of the CP, and as a result $N_g$ is equal to one side of an individual correlation "triangle" output. For example, as a result of the peak value detection (to detect $p_a$), the peak value and the corresponding time, m*, at which the peak value occurs is known. Once the value of time m* is determined, the algorithm observes the correlation value at the time corresponding to $N_g/2$ following m*, which results in $p_b$. In this instance, $p_a-2p_b=0$.

In Case 2, there are assumed to be two paths with arbitrary delay between [0:$N_g$], and p1>p2, where p1 is the peak value of the correlation triangular contribution associated with a first path and p2 is the peak value of the correlation triangular contribution associated with the second path. An example of this case is illustrated in the graph of FIG. 9. In the example of FIG. 9, there are two CP correlation triangular contributions, 901 and 902, which are associated with a first path and second path of a received signal, respectively. P1 is the peak value of the correlation contribution 901, while p2 is the peak value of the correlation contribution 902, as shown in the graph of FIG. 9. In this instance, the peak power of the second path is smaller than the first path, i.e., p1>p2. As also shown in the graph of FIG. 9, the delay, d, between the two paths is between [0:$N_g$]. That is, 0<d<$N_g$. The resulting CP correlation output, which is contributed to by the contributions 901 and 902, is shown as correlation curve 903. As in Case 1 discussed above with FIG. 8, $p_a$ and $p_b$ are again computed for the correlation curve 903. Unlike Case 1 discussed above with FIG. 8, however, in Case 2 of FIG. 9, $p_a-2p_b<0$. Also shown in the graph of FIG. 9 are points $p_x$ and $p_y$, which are discussed further below.

In Case 3, there are again assumed to be two paths, but in this case p1<p2. That is, the peak value of the correlation contribution associated with the second path is greater than the peak value of the correlation contribution associated with the first path. Case 3 is further classified into two subcases based on the delay between the two paths. The first subcase, Subcase A, is where the two paths have an arbitrary path delay between [0:$N_g/2$]. An example of this Case 3, Subcase A is illustrated in the graph of FIG. 10A. In the example of FIG. 10A, there are two CP correlation triangular contributions, 1001 and 1002, which are associated with a first path and second path of a received signal, respectively. P1 is the peak value of the correlation contribution 1001, while p2 is the peak value of the correlation contribution 1002, as shown in the graph of FIG. 10A. In this instance, the peak power of the second path is greater than the first path, i.e., p1<p2. As also shown in the graph of FIG. 10A, the delay, d, between the two paths is between [0:$N_g/2$]. That is, 0<d<$N_g/2$. The resulting CP correlation output, which is contributed to by the contributions 1001 and 1002, is shown as correlation curve 1003. As in Cases 1 and 2 discussed above with FIGS. 8-9, $p_a$ and $p_b$ are again computed for the correlation curve 1003. In the instance of FIG. 10A, $p_a-2p_b>0$. Also shown in the graph of FIG. 10A are points $p_s$, $p_x$ and $p_y$, which are discussed further below.

The second subcase of Case 3, Subcase B, is where the two paths have an arbitrary path delay between [$N_g/2$:$N_g$]. An example of this Case 3, Subcase B is illustrated in the graph of FIG. 10B. In the example of FIG. 10B, there are two CP correlation triangular contributions, 1011 and 1012, which are associated with a first path and second path of a received signal, respectively. P1 is the peak value of the correlation contribution 1011, while p2 is the peak value of the correlation contribution 1012, as shown in the graph of FIG. 10B. In this instance, the peak power of the second path is greater than the first path, i.e., p1<p2. As also shown in the graph of FIG. 10B, the delay, d, between the two paths is between [$N_g/2$:$N_g$]. That is, $N_g$>d>$N_g/2$. The resulting CP correlation output, which is contributed to by the contributions 1011 and 1012, is shown as correlation curve 1013. As in Cases 1 and 2 discussed above with FIGS. 8-9, pa and pb are again computed for the correlation curve 1013. As in the example of FIG. 10A, in the instance of FIG. 10A, $p_a-2p_b>0$. Also shown in the graph of FIG. 10B are points $p_s$, $p_x$ and $p_y$, which are discussed further below.

In view of the above, the presence of Case 1 (of FIG. 8) may be identified based on $p_a-2p_b=0$. That is, when $p_a-2p_b=0$, then it may be determined that Case 1 is encountered. Case 2 (e.g., of FIG. 9) can be identified based on $p_a-2p_b<0$. That is, when $p_a-2p_b<0$, then it may be determined that Case 2 is encountered. Case 3 (e.g., of FIGS. 10A and 10B) can be identified based on $p_a-2p_b>0$. That is, when $p_a-2p_b>0$, then it may be determined that Case 3 is encountered.

Figure 12:
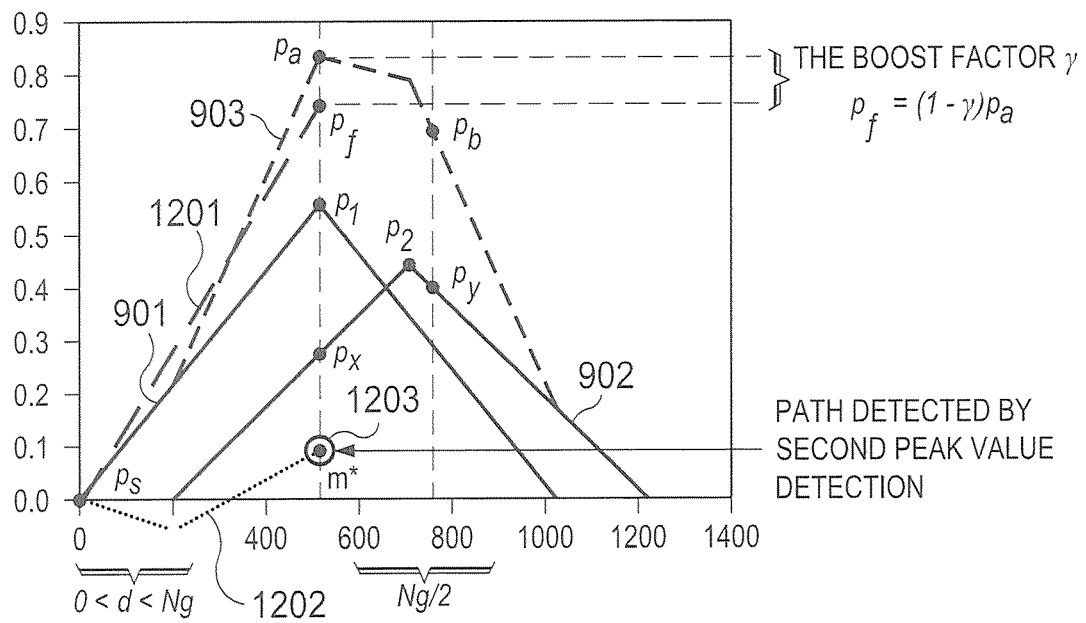
FIG. 12 shows a graph illustrating an example of a compensation curve that is employed for determining a second correlation curve, where the peak of the second correlation curve is used for detecting a first-received path for the exemplary case of FIG. 9.

FIGS. 11 and 12 show examples of Case 1 (e.g., as shown in FIG. 8 discussed above) and case 2 (e.g., as shown in FIG. 9 discussed above), respectively. FIG. 11 again shows a graph illustrating the CP correlation output triangle 801 of FIG. 8. As in FIG. 8 discussed above, $p_a$ and $p_b$ are again shown. In applying the double peak method of FIG. 7, the path detected by the first peak value detection (detecting m* in step 1 of FIG. 7) corresponds to the first-received path (which is the only path in the example of FIGS. 8 and 11). The second peak value detection is not necessary theoretically, but may be included to result in a universal algorithm that provides the correct result in the event of case misjudgment, e.g., when it is unknown for certain in a given environment whether there exists only a single path (and thus falls within the Case 1 scenario of FIGS. 8 and 11).

According to certain embodiments, a compensation curve (e.g., computed in step 2 of the exemplary double peak detection method of FIG. 7) is designed such that the path detected by the second peak value detection remains the same for the exemplary scenario of Case 1. That is, the compensation curve is implemented such that when the second peak value detection is computed, it again accurately detects the first and only path, just as the first peak value detected for the scenario of Case 1 of FIGS. 8 and 11. In certain embodiments, a boost factor, γ, is used for this bias purpose. In the illustrated example of FIG. 11, γ is equal to ⅛. The optimal boost factor, γ, for a given environment may be determined, for example, by simulation. Generally, γ is a relatively small value, say between approximately ¼ and 1/32, but larger boost factor values may be desired in certain environments. $P_s$ refers to the correlation value of the time point that is $N_g$ amount of time before time point m*, i.e., $P_s=\text{cor}(m^*-N_g)$. Theoretically speaking, $P_s$ should be 0 in case 1. In practice, $P_s$ is a very small value around zero due to noise. $P_s$ is one of the endpoints of the compensation curve in the proposed algorithm of this exemplary embodiment. In this algorithm, the point with coordinate $[x=m^*-N_g, y=0]$ is used as one end of the linear compensation curve rather than $[x=m^*-N_g, y=P_s]$ for universal solution purposes, as discussed further herein. It should be understood that there two levels of meaning of P. The first one is the physical point itself. For example, $P_a$ may denote the point on the correlation curve at time index (m*). Meanwhile, $P_a$ also denotes the correlation value of the physical point.

As shown in the exemplary graph of FIG. 11, the compensation curve 1101 is determined. In this example, a boost factor, γ, is used in determining the compensation curve 1101. In the illustrated example, the rising edge of the triangle 801 extends from point $p_s$ to point $p_a$. However, as illustrated, the compensation curve 1101 does not correspond identically to the rising edge of the triangle 801 but instead extends from point $p_s$ to point $p_f$. In this example, $p_f=(1-\gamma)p_a$. Thus, the correlation output 801 minus the compensation curve 1101 results in the second correlation output curve 1102. So, the peak value detection method may be performed a second time on the resulting second correlation output curve 1102 to detect the peak value 1103. Because the peak value 1103 is detected as a result of this second peak value detection, it may be referred to as the "double peak value" 1103. The double peak value 1103 of the second correlation output curve 1102 again correctly detects the first and only path at time m*, just as the value $p_a$ detected in the example of FIG. 11.

As discussed above, with FIG. 8, Case 1 can be identified using $p_a$ and $p_b$. For example, in Case 1 $p_a$ is exactly twice of $p_b$. So, in the instance in which $p_a-2p_b=0$, then it may be determined that Case 1 is present, and thus either the traditional single peak detection method (for detecting m* at the peak value $p_a$) or the above-described double peak detection method discussed with FIG. 11 (for detecting m* at the second peak value 1103) may be employed.

An example of the double peak detection method applied for Case 2 (of FIG. 9) is illustrated in FIG. 12. Again, Case 2 may be identified based on $p_a-2p_b<0$. FIG. 12 again shows a graph illustrating the correlation contribution 901 associated with a first-received path, the correlation contribution 902 associated with a second-received path, and the resulting CP correlation output 903 of FIG. 9. As in FIG. 9 discussed above, $p_a$ and $p_b$ are again shown. In applying the double peak method of FIG. 7, the path detected by the first peak value detection (detecting m* in step 1 of FIG. 7) corresponds to the first-received path. That is, because p1>p2 in Case 2, the peak value $p_a$ of CP correlation output 903 detects the first-received path at time point m*. Thus, in this example, the second peak value detection is not necessary theoretically, but may be included to result in a universal algorithm that provides the correct result in the event of case misjudgment, for example.

According to certain embodiments, a compensation curve (e.g., computed in step 2 of the exemplary double peak detection method of FIG. 7) is designed such that the path detected by the second peak value detection remains the same for the exemplary scenario of Case 2. That is, the compensation curve is implemented such that when the second peak value detection is computed, it again accurately detects the first-received path, just as the first peak value $p_a$ accurately detected in the illustrated scenario of Case 2 in FIG. 12. As discussed above with FIG. 11 in certain embodiments, a boost factor, γ, is used for this bias purpose. In the illustrated example of FIG. 12, γ is equal to ⅛, but may be some other value. Again, the optimal boost factor, γ, for a given environment may be determined, for example, by simulation.

As shown in the exemplary graph of FIG. 12, the compensation curve 1201 is determined. In this example, a boost factor, γ, is used in determining the compensation curve 1201. In the illustrated example, the rising edge of the correlation contribution 901 that is detected by the peak value $p_a$ of the correlation curve 903 extends from point $p_s$ to point p1. However, as illustrated, the compensation curve 1201 does not correspond identically to the rising edge of the detected contribution triangle 901, but instead extends from point $p_s$ to point $p_f$. In this example, $p_f=(1-\gamma)p_a$. Thus, the rising edge of the detected contribution triangle 901 minus the compensation curve 1201 results in the second correlation output curve 1202. So, the peak value detection method may be performed a second time on the resulting second correlation output curve 1202 to detect the peak value 1203. Because the peak value 1203 is detected as a result of this second peak value detection, it may be referred to as the "double peak value" 1203. The double peak value 1203 of the second correlation output curve 1202 again correctly detects the first-received path at time m*, just as the value $p_a$ detected in the example of FIG. 12.

As discussed above, with FIG. 9, Case 1 can be identified using $p_a$ and $p_b$. For example, in the instance in which $p_a-2p_b<0$, then it may be determined that Case 2 is present, and thus either the traditional single peak detection method (for detecting m* at the peak value $p_a$) or the above-described double peak detection method discussed with FIG. 12 (for detecting m* at the second peak value 1203) may be employed.

As shown on the graph of FIG. 12, Px, Py are two points on the correlation curve of the second path. In this example, these points are defined to assist the derivation of the relationship between $P_a$, $P_b$, $P_s$ and so on. This is true for $P_1$ and $P_2$ as well. For example, Pa=P1+Px, and Pb=P-½+Py because Px<2Py, Pa<2Pb.

Concerning the exemplary formula illustrated in FIG. 12 for computing y, it is the mathematic expression of the linear compensation curve. The starting point of the linear curve is with coordinate [x=m*-Ng, y=0], and the ending point of the linear curve is with coordinate [x=m*, y=Pf], such that the gradient of the linear curve is Pf/Ng, and the curve itself can be expressed as y=Pf/N(x-(m*-Ng)).

It should be noted that the offset of this linear curve in the Y-axis will not affect the result of second peak value detection. So, any linear curve with y=Pf/N(x-(m*-Ng)+delta, where delta is any appropriate value, can be used as the compensation curve. In the exemplary algorithm of the above-described embodiment, delta can be chosen in order to conduct a simple expression of the linear curve formula.

In the examples of FIGS. 11 and 12, $p_s$ is considered having value 0. Thus, in this exemplary embodiment, when $p_a-2p_b \leq 0$, then $p_s$ is considered having value 0. This may simplify some of the calculations being performed for Cases 1 and 2.

Figure 13:
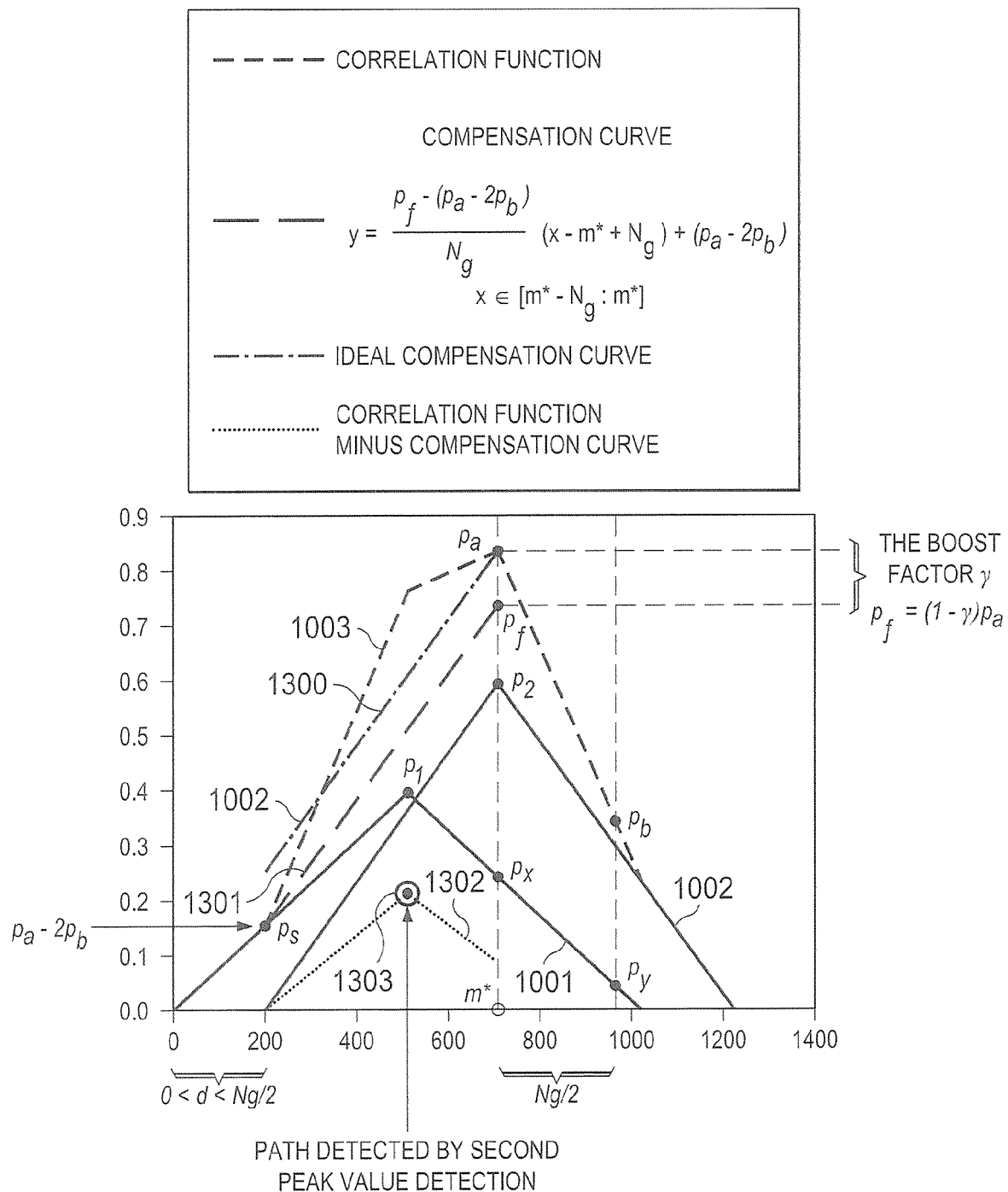
FIG. 13 shows a graph illustrating an example of a compensation curve that is employed for determining a second correlation curve, where the peak of the second correlation curve is used for detecting a first-received path for the exemplary case of FIG. 10A.

An example of the double peak detection method applied for Case 3, subcase A (of FIG. 10A) is illustrated in FIG. 13. Again, Case 3 may be identified based on $p_a-2p_b>0$. As with FIG. 10A, FIG. 13 again shows a graph illustrating the correlation contribution 1001 associated with a first-received path, the correlation contribution 1002 associated with a second-received path, and the resulting CP correlation output 1003. As in FIG. 10A discussed above, $p_a$ and $p_b$ are again shown. In applying the double peak method of FIG. 7, the path detected by the first peak value detection (detecting m* in step 1 of FIG. 7) corresponds to the second-received path. That is, because p1<p2 in Case 3, the peak value $p_a$ of CP correlation output 1003 detects the second-received path at time point m*, rather than detecting the first-received path.

The compensation curve (e.g., computed in step 2 of the exemplary double peak detection method of FIG. 7) is then generated. As discussed above with FIGS. 11 and 12, in certain embodiments, a boost factor, γ, may be used for biasing purposes. In the illustrated example of FIG. 13, γ, is equal to ⅛, but may be some other value. Again, the optimal boost factor, γ, for a given environment may be determined, for example, by simulation.

As shown in the exemplary graph of FIG. 13, the compensation curve 1301 is determined. In this example, an ideal compensation curve 1300 is illustrated. The ideal compensation curve 1300 would correspond ideally to the rising edge of the contribution triangle 1002 associated with the path detected by $p_a$ (i.e., the second-received path in this example). Thus, the ideal compensation curve 1300 would be drawn from the $p_x$ value at the time point that is $N_g$ ahead of m* to $p_a$ at time point m*. It should be noted that $p_a = p2+p_x$.

As the compensation curve 1301 is a linear curve, it can be determined by two points on the curve. After the first peak value detection, the ending point of the compensation curve is known as the peak point $P_a$, and it remains desirable to find the starting point of the compensation linear curve. The X coordinate of the starting point can be calculated as $m*-N_g$ as discussed above, and so the y coordinate of the starting point of the linear curve is to be determined. As shown in FIG. 13, $P_a = P2+P_x$. Thus, if the value of $P_x$ is calculated, then the linear curve 1300 can be drawn, which will be with gradient $P_2/N_g$ which is exactly the gradient of the rising edge of the correlation curve of the second path. However, $P_x$ cannot be calculated merely from the known values of Pa, Pb, and Ps. So, according to one embodiment, some known values instead of $P_x$ are used to draw the compensation curve. For instance, $P_s$, which is the correlation value at time $m*-N_g$, is smaller than but similar to $P_x$. So, in one embodiment, the point $P_s$ is used as the starting point of the compensation curve. By considering the difference between $P_s$ and $P_x$, the ending point may be adjusted from $P_a$ to $P_f$, which is a little smaller too.

Furthermore, it can be derived that $P_s = P_a - 2P_b$ theoretically; however, a little bit of difference exists in practice. For this case (case 3A), it will be the same to use either the value of $P_s$ or $(P_a - 2P_b)$ to draw the compensation curve. In one embodiment, (Pa-2Pb) is used for compatibility purposes with Case 3B, as discussed below. Accordingly, in this example, as shown in FIG. 13, $$y = \frac{Pf - (Pa - 2Pb)}{Ng}(x - m^* + Ng) + (Pa - 2Pb).$$

Thus, the rising edge of the detected contribution triangle 1002 minus the compensation curve 1301 results in the second correlation output curve 1302. So, the peak value detection method may be performed a second time on the resulting second correlation output curve 1302 to detect the peak value 1303. Because the peak value 1303 is detected as a result of this second peak value detection, it may be referred to as the "double peak value" 1303. The double peak value 1303 of the second correlation output curve 1302 correctly detects the first-received path, as it aligns time-wise with the peak value $p_1$ of the contribution 1001 associated with the first-received path. In view of the above, the mathematics employed for subcase A of Case 3 illustrated in FIG. 13 are compatible with the above-described double peak detection method employed for Case 1 and Case 2 (in FIGS. 11 and 12).

Figure 14:
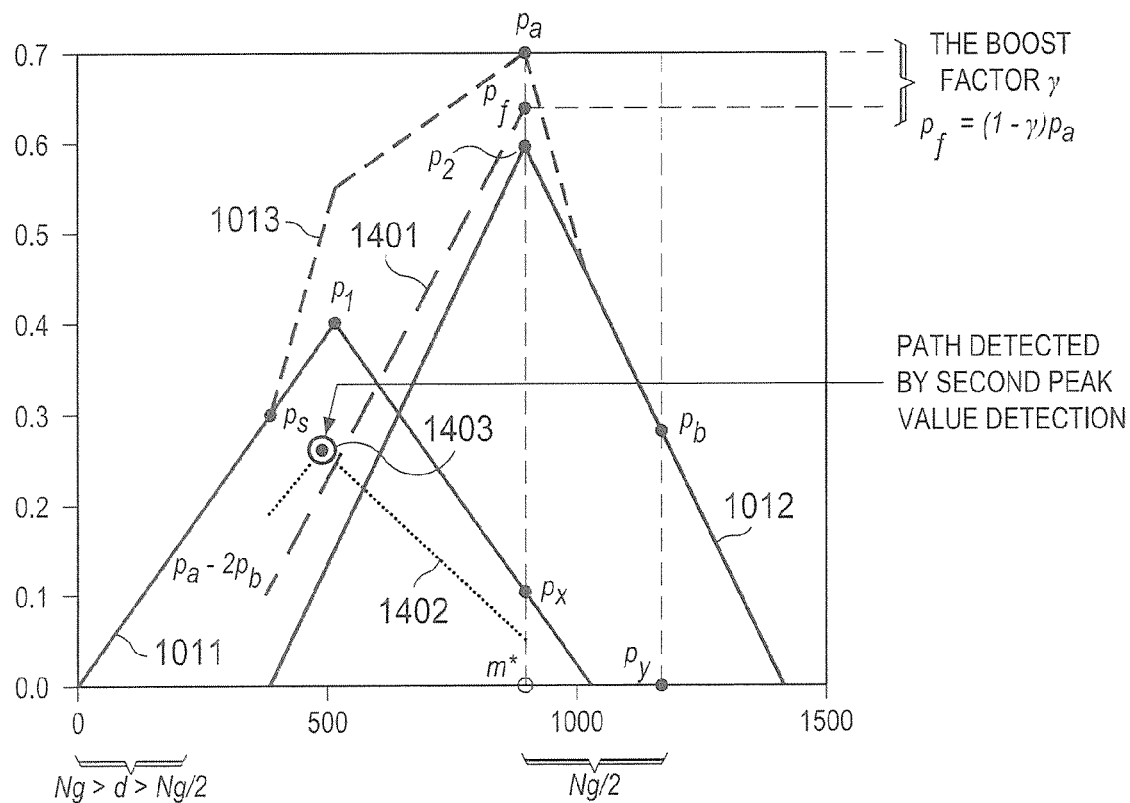
FIG. 14 shows a graph illustrating an example of a compensation curve that is employed for determining a second correlation curve, where the peak of the second correlation curve is used for detecting a first-received path for the exemplary case of FIG. 10B.

An example of the double peak detection method applied for Case 3, subcase B (of FIG. 10B) is illustrated in FIG. 14. Again, Case 3 may be identified based on $p_a - 2p_b > 0$. As with FIG. 10B, FIG. 14 again shows a graph illustrating the correlation contribution 1011 associated with a first-received path, the correlation contribution 1012 associated with a second-received path, and the resulting CP correlation output 1013. As in FIG. 10B discussed above, $p_a$ and $p_b$ are again shown. In applying the double peak method of FIG. 7, the path detected by the first peak value detection (detecting m* in step 1 of FIG. 7) corresponds to the second-received path. That is, because p1<p2 in Case 3, the peak value $p_a$ of CP correlation output 1013 detects the second-received path at time point m*, rather than detecting the first-received path.

The compensation curve (e.g., computed in step 2 of the exemplary double peak detection method of FIG. 7) is then generated. As discussed above with FIGS. 11 and 12, in certain embodiments, a boost factor, γ, may be used for biasing purposes. In the illustrated example of FIG. 14, γ is equal to ⅛, but may be some other value. Again, the optimal boost factor, γ, for a given environment nay be determined, for example, by simulation.

As shown in the exemplary graph of FIG. 14, the compensation curve 1401 is determined. In this case, $p_x$ is equal to $p_a - 2p_b$. So, in subcase B of Case 3, the compensation curve 1401 is drawn as a line from the value $p_a - 2p_b$ at time point $m*-N_g$ to the value $p_f$ at time point m*, just as in subcase A of Case 3 discussed above with FIG. 13. In subcase B of Case 3 shown in the example of FIG. 14, the use of $p_a - 2p_b$ in this manner results in the ideal compensation curve 1401. However, in subcase A of Case 3 discussed above with FIG. 13, it results in an approximation compensation curve 1301 rather than the ideal compensation curve 1300. That is a difference between the two subcases A and B of Case 3, and is the reason for using the boost factor, γ. That is, the boost factor, γ, is some value to compensate for the approximation of the compensation curve 1301 in subcase A. The boost factor, γ, is not really needed in subcase B of Case 3 (of FIG. 14), but it may be applied anyway in this example to make the algorithm for detecting the first-received path universally applicable (or compatible) for both subcases A and B. In practical application, it may be unknown in a given instance whether subcase A of Case 3 or subcase B of Case 3 is being encountered, and so making the algorithm for detecting the first-received path universally applicable (or compatible) for both subcases A and B ensures that the first-received path is accurately detected irrespective of which of these subcases is encountered.

Thus, in this example, the compensation curve 1401 extends from the value $p_a - 2p_b$ at time point m*-Ng to the value $p_f$ at time point m*. Again, $p_f = (1-γ)p_a$. Thus, the rising edge of the detected contribution triangle 1012 minus the compensation curve 1401 results in the second correlation output curve 1402. So, the peak value detection method may be performed a second time on the resulting second correlation output curve 1402 to detect the peak value 1403. Because the peak value 1403 is detected as a result of this second peak value detection, it may be referred to as the "double peak value" 1403. The double peak value 1403 of the second correlation output curve 1402 correctly detects the first-received path, as it aligns time-wise with the peak value p1 of the contribution 1011 associated with the first-received path. In view of the above, the mathematics employed for subcase B of Case 3 illustrated in FIG. 14 are compatible with the above-described double peak detection method employed for Case 1 and Case 2 (in FIGS. 11 and 12), as well as being compatible with the mathematics employed for subcase A of Case 3 (of FIG. 13).

While two paths are illustrated for ease of discussion in many of the above examples of FIGS. 7-14, in certain embodiments any number of paths (two or more) may be present in such multipath scenarios, and the above-described double peak detection method may be readily adapted for use in detecting an early (e.g. first-received) path in any such multi-path OFDM communication, as mentioned above.

In certain embodiments, the above-described Case 3 situation may be detected based on $p_a-2p_b>0$, and the above-described double peak detection method may be applied for such detected Case 3. The single peak detection method may be applied for Cases 1 and 2 (e.g., when $p_a-2p_b \leq 0$), in certain embodiments. In other embodiments, the double peak detection method may be applied to all of Cases 1-3. That is, because the mathematics involved in the exemplary double peak value detection method are compatible across all of Cases 1-3, in certain embodiments a universal algorithm may be employed for detecting an early (e.g., first-received) path in a received OFDM communication.

Figure 15:
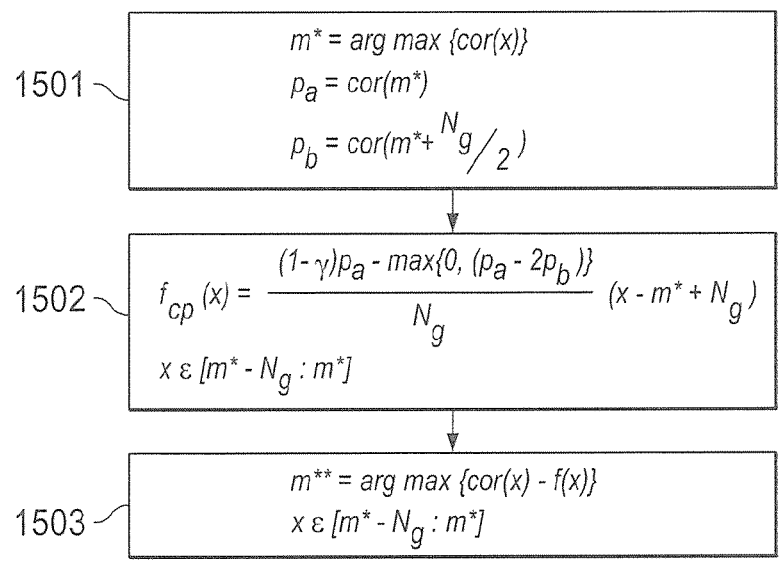
FIG. 15 shows an operational flow for one exemplary universal algorithm that may be applied for accurately detecting a first-received path across any of the exemplary cases of FIGS. 8-10B.

FIG. 15 shows an operational flow for one exemplary universal algorithm that may be applied for accurately detecting a first-received path across any of Cases 1-3 discussed above. In operational block 1501 a first peak detection is performed to determine m*. As shown, $m^*=\arg\max\{cor(x)\}$ in this example. Thus, m* equals the maximum correlation function. As further shown in operational block 1501, $p_a$ and $p_b$ are determined. In this example, $p_a=cor(m^*)$ (that is, $p_a$ equals the power of the correlation function at time point m*), and $$p_b = cor\left(m^* + \frac{N_g}{2}\right)$$

(that is, $p_b$ equals the power of the correlation function at time point that is $N_g/2$ after m*).

In operational block 1502 of this exemplary universal algorithm, $p_a$ and $p_b$ are used to determine the compensation curve. The following mathematical formula is applied in this example for computing the compensation curve:

$$f_{cp}(x) = \frac{(1-\gamma)p_a - \max\{0, (p_a - 2p_b)\}}{N_g}(x - m^* + N_g)$$

$$x \in [m^* - N_g : m^*]$$

The above mathematical formula employed in operational block 1502 can be applied for any of the above-discussed Cases 1-3. In the above mathematical formula of operational block 1502, there is a max of 0 and $p_a-2p_b$. So, if $p_a-2p_b$ is smaller or equal to 0, that means that either Case 1 or Case 2 is being encountered, in which case the compensation curve is drawn from 0 at time point $m^*-N_g$ to the value $p_f$ at time point m*. Again, $p_f$ is $(1-\gamma)p_a$ in this example. When $p_a-2p_b$ is larger than 0, that means that Case 3 is being encountered, in which case the compensation curve is drawn from value $p_a-2p_b$ at time point $m^*-N_g$ to the value $p_f$ at time point m*. Thus, the mathematical formula employed in operational block 1502 can generate an appropriate compensation curve for all three cases.

Then, in operational block 1503, a second peak value detection is performed to detect time point m**. The second peak value detection is performed on the resulting correlation curve that results from subtracting the compensation curve determined in block 1502 from the first correlation curve. Thus, in the example of FIG. 15, the following mathematical algorithm is employed in operational block 1503:

$$m^{**} = \arg\max\{cor(x) - f(x)\}$$

$$x \in [m^* - N_g : m^*].$$

Simulation results have verified the robustness and accuracy of the above-described double peak value method for detecting a first-received path in any of the above-mentioned Cases 1-3. In testing results obtained, for all cases in single cell deployment, the one shot failure probability is smaller than 1%. For an SFN network, the one short failure probability detected is around 5-7% for short echo path, and the one shot failure probability is around 10-15% for long echo path (path delay larger than CP). Thus, the one shot failure rate of the above-described double peak value detection method is much smaller than in conventional methods that have been proposed for detecting early paths in OFDM-based communication.

Figure 16:
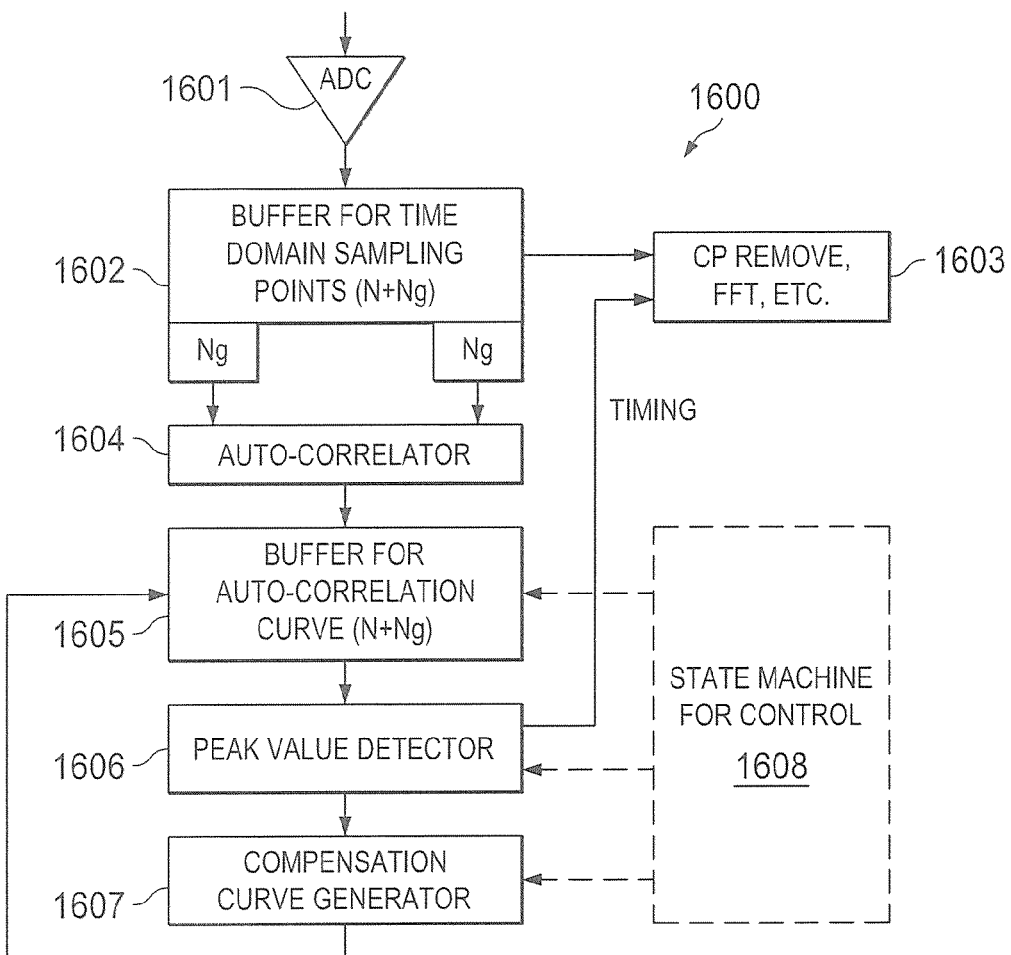
FIG. 16 shows a block diagram of an exemplary system for implementing the double peak value detection method according to one embodiment of the present invention.

FIG. 16 shows a block diagram of an exemplary system 1600 for implementing an embodiment of the double peak value detection method. The system 1600 includes an analog-to-digital converter (ADC) 1601 that receives the OFDM-based communication and converts it into a digital signal, as is commonly employed in OFDM-based receivers. As is also commonly employed in certain OFDM-based receivers, a buffer 1602 for buffering time domain sampling points (N+$N_g$), processing logic 1603 for performing CP remove, FFT, etc., and an auto-correlator 1604 for generating a correlation curve (based on CP correlation) are further included in system 1600. For instance, auto-correlator 1604 generates the exemplary correlation curve 73 illustrated in graph 701 in FIG. 7.

A buffer 1605 is also included for buffering the correlation curve generated by auto-correlator 1604. A peak value detector 1606 is also included, which is operable to analyze the correlation curve and determine its peak value ($p_a$) and the corresponding time point, which is referred to in the above examples as m*. A compensation curve generator 1607 is also included which is operable to generate a compensation curve (such as compensation curve 72A in graph 702 of FIG. 7) in the manner described in detail above. As discussed above, the generated compensation curve may be subtracted from the correlation curve generated by auto-correlator 1604 to result in a second correlation curve, which may be stored to buffer 1605, and then peak value detector 1606 may perform a second peak value detection on the second correlation curve, as discussed in detail above, in order to detect the time point m** of the early path (e.g., first-received path) in the received OFDM-based communication. As further shown in FIG. 16, a state machine 1608 may be implemented for controlling the operations of buffer 1605, peak value detector 1606, and compensation curve generator 1607 in order to perform the double peak value detection method as described further herein.

As a result of the double peak value detection method, the timing information (e.g., time point m** associated with a first-received path) is determined such that processing logic 1603 can remove the correct CP in order for the OFDM receiver to read the correct part of the OFDM symbol body for performing FFT.

Buffers 1602 and 1605 may be any suitable data storage medium for storing digital data, such as random access memory (RAM), a hard disk, optical data storage medium, magnetic data storage medium etc. Processing logic 1603 and/or state machine 1608 may include a central processing unit (CPU) that is operable to read and process the data stored to buffers 1602 and 1605 and software code instructions (stored to a computer-readable medium, such as memory, a hard disk, optical data storage medium, magnetic data storage medium, etc.) for performing the above-described double peak detection method.

Many of the elements described herein, when implemented via computer-executable instructions, are in essence the software code defining the operations thereof. For instance, the above-described double peak value detection method may be implemented via software code for performing the mathematical operations described above. The executable instructions or software code may be obtained, for example, from a computer-readable medium (e.g., a hard drive media, optical media, EPROM, EEPROM, tape media, cartridge media, flash memory, ROM, memory stick, and/or the like). In certain embodiments, a CPU (e.g., of state machine 1608) may execute the various logical instructions according to embodiments of the present invention. For example, a CPU may execute machine-level instructions for performing the mathematical computations of the exemplary operational flow described above in conjunction with FIG. 15.

The exemplary system 1600 of FIG. 16 and/or other implementation of the above-described double peak detection method may be employed in any OFDM-based communication receiver device, such as 802.11 devices, digital TV devices, etc.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture compositions of matter, means, methods, or steps.

What is claimed is:

1. A method comprising:
receiving an orthogonal frequency-division multiplexing (OFDM)-based communication at a receiver;
performing cyclic prefix (CP) correlation to determine a first correlation curve for the received OFDM-based communication;
performing a first peak value detection on the first correlation curve to determine a time point, m*, at which a peak value occurs in the first correlation curve;
generating a compensation curve corresponding to a contribution to the first correlation curve by a path present in the received OFDM-based communication, said path having its peak contribution to the first correlation curve at said time point m*;
using said compensation curve for adjusting said first correlation curve to produce a second correlation curve; and
performing a second peak value detection on the second correlation curve to determine a time point, m, at which a peak value occurs in the second correlation curve, wherein the time point m corresponds to a desired early path present in the received OFDM-based communication.

2. The method of claim 1 wherein said adjusting comprising:
subtracting said compensation curve from said first correlation curve to produce said second correlation curve.

3. The method of claim 1 wherein the received OFDM-based communication comprises a multi-path symbol, and wherein the desired early path comprises a first-received path in the multi-path symbol.

4. The method of claim 1 wherein a universal algorithm is employed for determining the compensation curve for a plurality of different cases.

5. The method of claim 4 wherein the universal algorithm is applicable for accurately detecting any of the following cases:
 a) a single path in a received OFDM symbol having only the single path;
 b) a first path in a received OFDM symbol that has two paths having arbitrary delay between $[0:N_g]$, wherein $N_g$ is the length of the CP for the OFDM symbol, and peak power associated with a first of the two paths is greater than peak power associated with a second of the two paths;
 c) a first path in a received OFDM symbol that has two paths where peak power associated with a first of the two paths is less than peak power associated with a second of the two paths, and where the two paths are separated in time by an arbitrary delay between $[0:N_g/2]$; and
 d) a first path in a received OFDM symbol that has two paths where peak power associated with a first of the two paths is less than peak power associated with a second of the two paths, and where the two paths are separated in time by an arbitrary delay between $[N_g/2: N_g]$.

6. The method of claim 1 wherein the compensation curve is computed as:

$$f_{cp}(x) = \frac{(1-\gamma)p_a - \max\{0, (p_a - 2p_b)\}}{N_g}(x - m^* + N_g)$$

$$x \in [m^* - N_g: m^*]$$

where $f_{cp}(x)$ is a value on the compensation curve at point x, $\gamma$ is a boost factor, $p_a$ is a peak value of a cyclic prefix (CP) correlation of an OFDM symbol, $p_b$ is a correlation value at a time following m*, $\max\{0,(p_a-2p_b)\}$ is a maximum correlation function, m* is the starting sampling point of the full OFDM symbol, and $N_g$ is a length of the CP of the OFDM symbol.

7. The method of claim 1 further comprising:
determining whether $p_a-2p_b \leq 0$, where $p_a$ is a peak value of a cyclic prefix (CP) correlation of an OFDM symbol, $p_b$ is a correlation value at a time following m*, m* is the starting sampling point of the full OFDM symbol; and
performing said generating said compensation curve, using said compensation curve for adjusting said first correlation curve, and performing said second peak value detection when $p_a-2p_b>0$.

8. The method of claim 1 further comprising:
  detecting when said received OFDM-based communication comprises a multi-path symbol having two paths with a first of the two paths having a smaller peak value than a second of the two paths.

9. The method of claim 8 wherein said detecting comprises determining whether $p_a - 2p_b > 0$, where $p_a$ is a peak value of a cyclic prefix (CP) correlation of an OFDM symbol, $p_b$ is a correlation value at a time following m*, m* is the starting sampling point of the full OFDM symbol.

10. The method of claim 8 further comprising performing said generating said compensation curve, using said compensation curve for adjusting said first correlation curve, and performing said second peak value detection when detected that said received OFDM-based communication comprises a multi-path symbol having two paths with a first of the two paths having a smaller peak value than a second of the two paths.

11. A method comprising:
  receiving an orthogonal frequency-division multiplexing (OFDM)-based communication at a receiver;
  performing a first peak value detection to detect a largest power path that is present in the received OFDM-based communication, wherein said performing said first peak value detection comprises performing cyclic prefix (CP) correlation to determine a first correlation curve for the received OFDM-based communication, and determining a peak value of said first correlation curve; and
  performing a second peak value detection to detect an early path present in the received OFDM-based communication.

12. The method of claim 11 wherein the received OFDM-based communication comprises a multi-path symbol, and wherein the early path is a first-received path in the multi-path symbol.

13. The method of claim 11 wherein said performing said second peak value detection comprises:
  generating a compensation curve;
  subtracting said compensation curve from said first correlation curve to produce a second correlation curve; and
  determining a peak value of said second correlation curve.

14. The method of claim 11 further comprising:
  determining a first time point, m*, corresponding to the determined peak value of said first correlation curve, wherein the first time point, m*, corresponds to said largest power path.

15. The method of claim 14 wherein said performing said second peak value detection comprises:
  generating a compensation curve corresponding to a contribution to said first correlation curve by said largest power path;
  subtracting said compensation curve from said first correlation curve to produce a second correlation curve; and
  determining a peak value of said second correlation curve.

16. The method of claim 15 further comprising:
  determining a second time point, m, corresponding to the determined peak value of said second correlation curve, wherein the second time point, m, corresponds to said early path.

17. A method comprising:
  receiving an orthogonal frequency-division multiplexing (OFDM)-based communication at a receiver;
  performing a first peak value detection to detect a largest power path that is present in the received OFDM-based communication;
  determining whether $p_a - 2p_b \leq 0$, where $p_a$ is a peak value of a cyclic prefix (CP) correlation of an OFDM symbol, $p_b$ is a correlation value at a time following m*, m* is the starting sampling point of the full OFDM symbol; and
  performing a second peak value detection to detect an early path present in the received OFDM-based communication only when $p_a - 2p_b > 0$.

18. The method of claim 17 wherein said detected largest power path detected by said first peak value detection is determined as a desired early path present in the received OFDM-based communication when $p_a - 2p_b \leq 0$.

19. A method comprising:
  receiving an orthogonal frequency-division multiplexing (OFDM)-based communication at a receiver;
  performing a first peak value detection to detect a largest power path that is present in the received OFDM-based communication; and
  performing a second peak value detection to detect an early path present in the received OFDM-based communication, wherein said second peak value detection accurately detects any of the following cases:
  a) a single path in a received OFDM symbol having only the single path;
  b) a first path in a received OFDM symbol that has two paths having arbitrary delay between $[0:N_g]$, wherein Ng is the length of a cyclic prefix (CP) for the OFDM symbol, and peak power associated with a first of the two paths is greater than peak power associated with a second of the two paths;
  c) a first path in a received OFDM symbol that has two paths where peak power associated with a first of the two paths is less than peak power associated with a second of the two paths, and where the two paths are separated in time by an arbitrary delay between $[0:N_g/2]$; and
  d) a first path in a received OFDM symbol that has two paths where peak power associated with a first of the two paths is less than peak power associated with a second of the two paths, and where the two paths are separated in time by an arbitrary delay between $[N_g/2:N_g]$.

20. A method comprising:
  receiving an orthogonal frequency-division multiplexing (OFDM)-based communication at a communication device;
  processing, by the communication device, the received OFDM-based communication with a double peak value detection algorithm, said double peak value detection algorithm configured to perform the following computations:
  a) computing m* as m*=arg max{cor(x)}, where m* is a starting sampling point of a full OFDM symbol,
  computing $p_a$ as $p_a = \mathrm{cor}(m^*)$,
  computing $p_b$ as $$p_b = \mathrm{cor}\left(m^* + \frac{N_g}{2}\right),$$

where Ng is length of a cyclic prefix (CP) of the OFDM symbol, $p_a$ is a peak value of a cyclic prefix (CP) correlation of an OFDM symbol, and $p_b$ is a correlation value at a time following m*;

b) computing a compensation curve as $$f_{cp}(x) = \frac{(1-\gamma)p_a - \max\{0, (p_a - 2p_b)\}}{N_g}(x - m^* + N_g)$$

$x \in [m^*-N_g:m^*]$, wherein $\gamma$ is a boost factor, and $\max\{0,(p_a-2p_b)\}$ is a maximum correlation function, and c) computing m as $m^{} = \arg\max\{cor(x) - f(x)\}$ $x \in [m^*-N_g:m^*]$, wherein m** is a time point corresponding to a desired early path in the received OFDM-based communication.

21. A system comprising:

interface for receiving an orthogonal frequency-division multiplexing (OFDM)-based communication;

auto-correlator for performing cyclic prefix (CP) correlation to determine a first correlation curve for the received OFDM-based communication;

peak value detector for detecting a peak value; and compensation curve generator for generating a compensation curve;

wherein said system is configured to use said compensation curve for adjusting said first correlation curve to produce a second correlation curve, and performing a second peak value detection on the second correlation curve to determine a time point that corresponds to a desired early path present in the received OFDM-based communication.

22. The system of claim 21 wherein said peak value detector performs said second peak value detection on the second correlation curve.

23. The system of claim 21 wherein said OFDM-based communication comprises a multi-path OFDM symbol, and wherein said desired early path is a first-received path in the multi-path OFDM symbol.

* * * * *

UNITED STATES PATENT AND TRADEMARK OFFICE
CERTIFICATE OF CORRECTION

PATENT NO. : 8,451,957 B2
APPLICATION NO. : 12/421536
DATED : May 28, 2013
INVENTOR(S) : Pan Zhengang et al.

It is certified that error appears in the above-identified patent and that said Letters Patent is hereby corrected as shown below:

In the Specification

Column 1, Line 15, delete the word "ASSIGNMENTS" and replace with --ASSIGNMENT--.

Column 2, Line 55, delete the equation reading "1/N·Ts)" and replace with --1/(N·Ts)--.

Column 13, Line 58, delete the portion of the equation reading "M*" and replace with --m*--.

Column 18, Line 37, delete the equation reading "Pb=P-½+Py" and replace with --Pb=P½+Py--.

Signed and Sealed this
Twenty-third Day of July, 2013

Teresa Stanek Rea
*Acting Director of the United States Patent and Trademark Office*